July 19, 1938.  W. W. LASKER ET AL  2,124,177
TABULATING MACHINE
Filed May 8, 1931    17 Sheets-Sheet 7
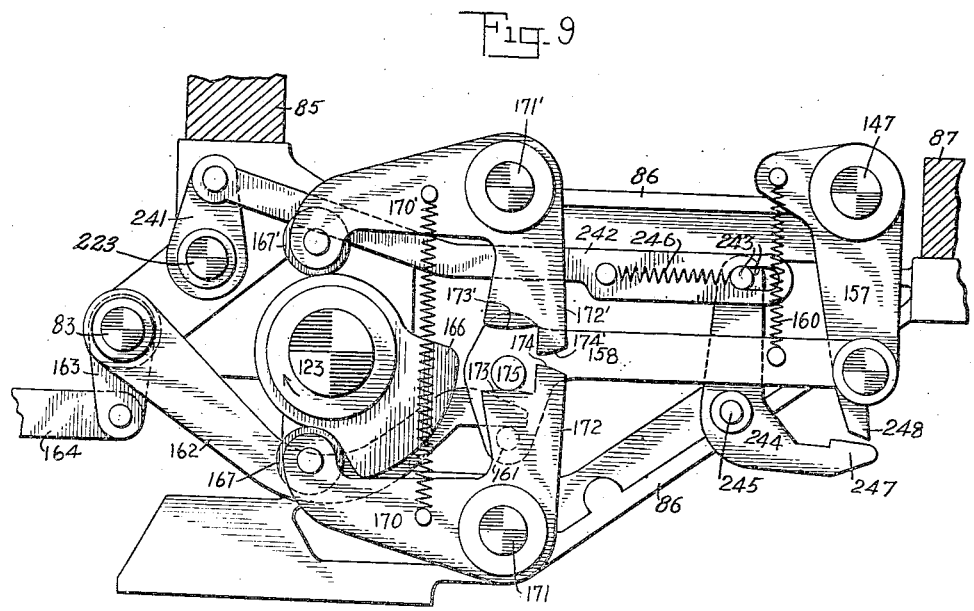
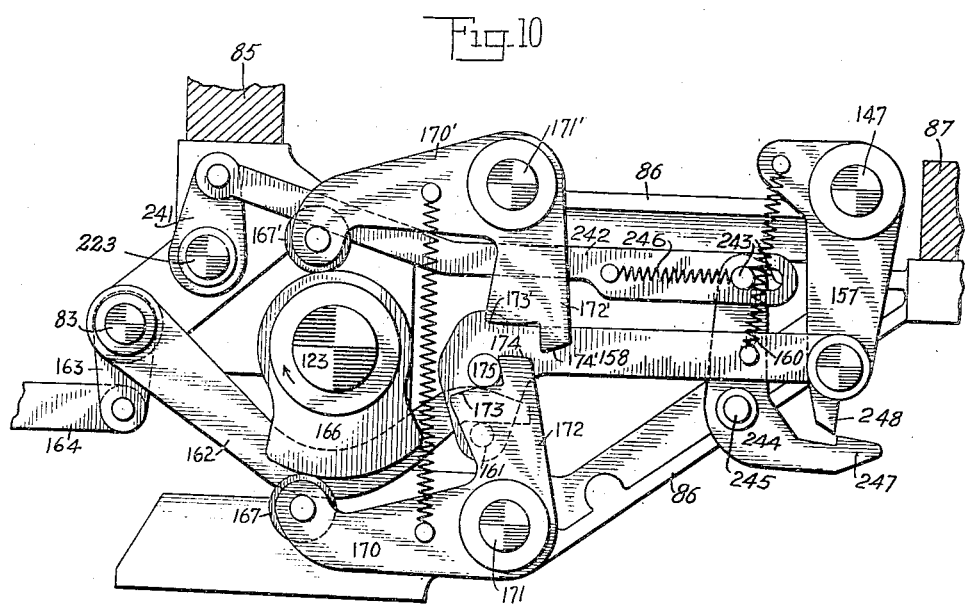
INVENTORS
William W. Lasker
BY Charles Ruiz
Robert K. Strother
ATTORNEY July 19, 1938.  W. W. LASKER ET AL  2,124,177
TABULATING MACHINE
Filed May 8, 1931   17 Sheets-Sheet 8
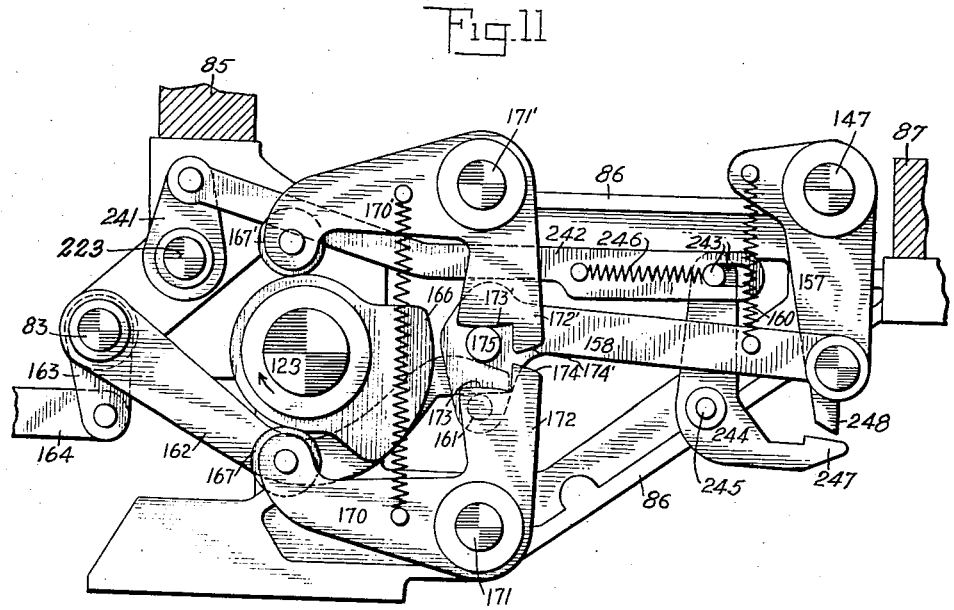
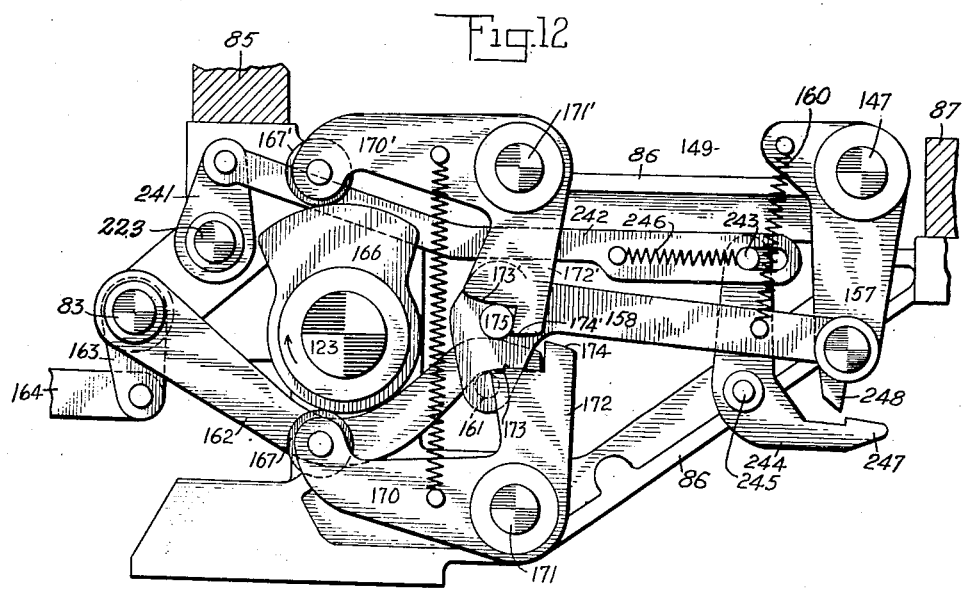
INVENTORS
William W. Lasker
BY Charles Ruiz
Robert H. Strothers
ATTORNEY July 19, 1938.  W. W. LASKER ET AL  2,124,177
TABULATING MACHINE
Filed May 8, 1931   17 Sheets-Sheet 9

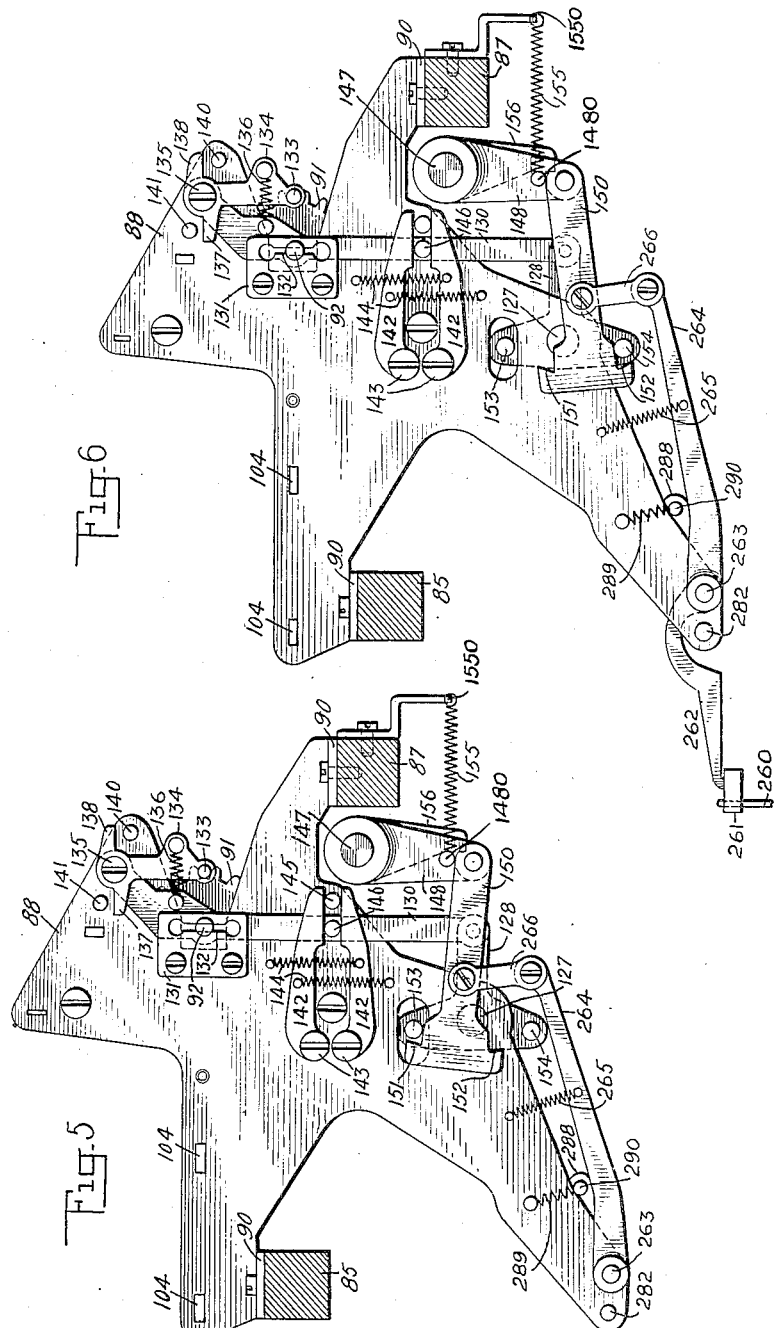

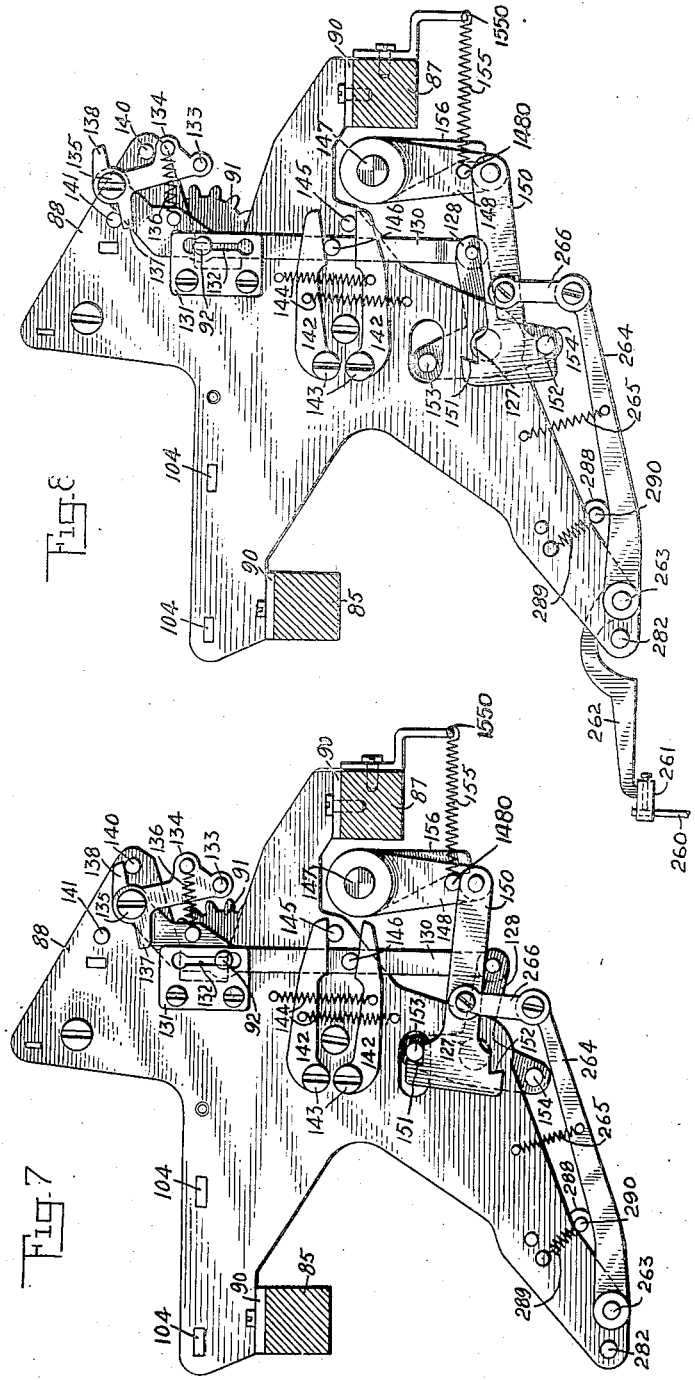

INVENTORS
William W. Lasker
BY Charles Ruig
Robert H. Strother
ATTORNEY

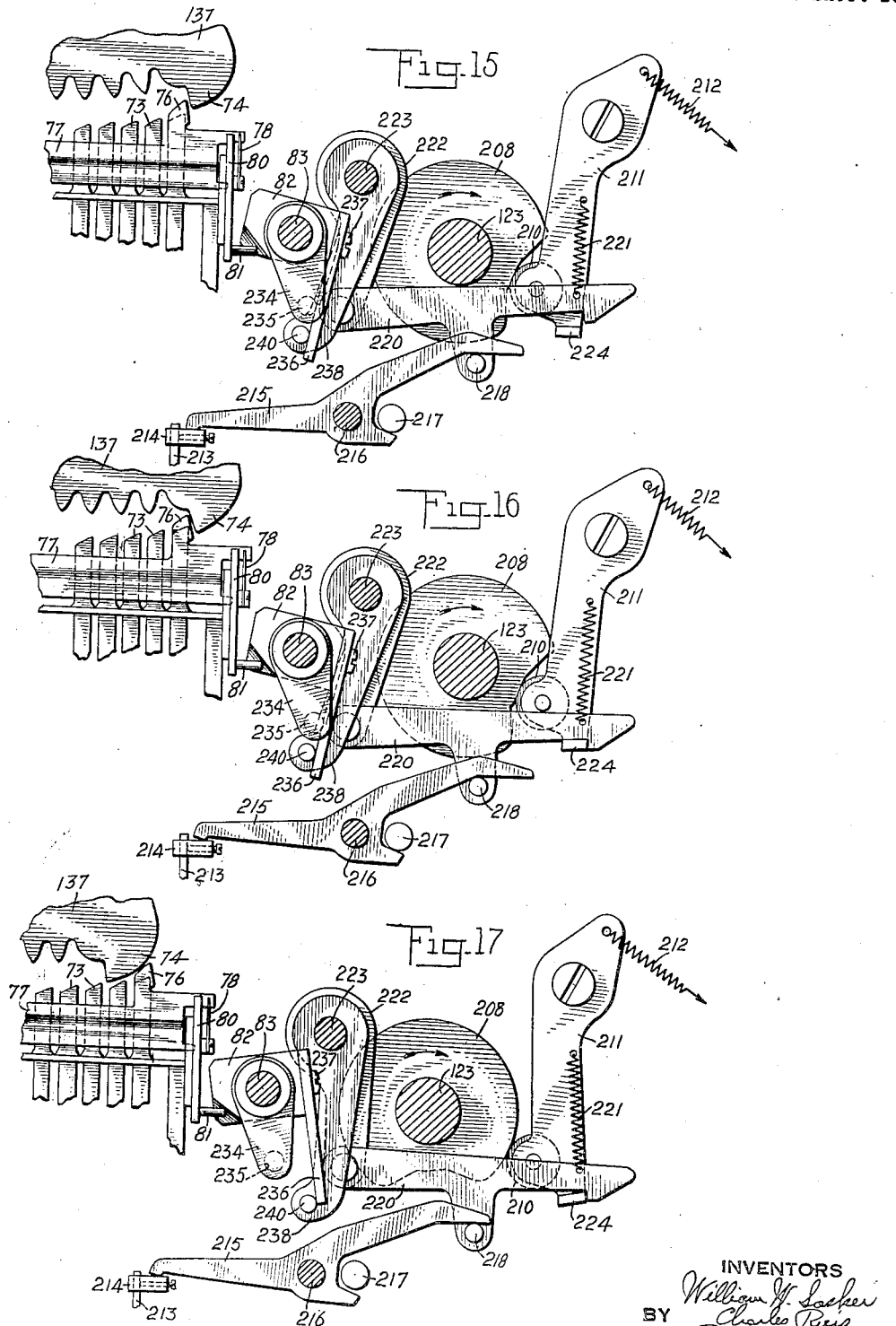

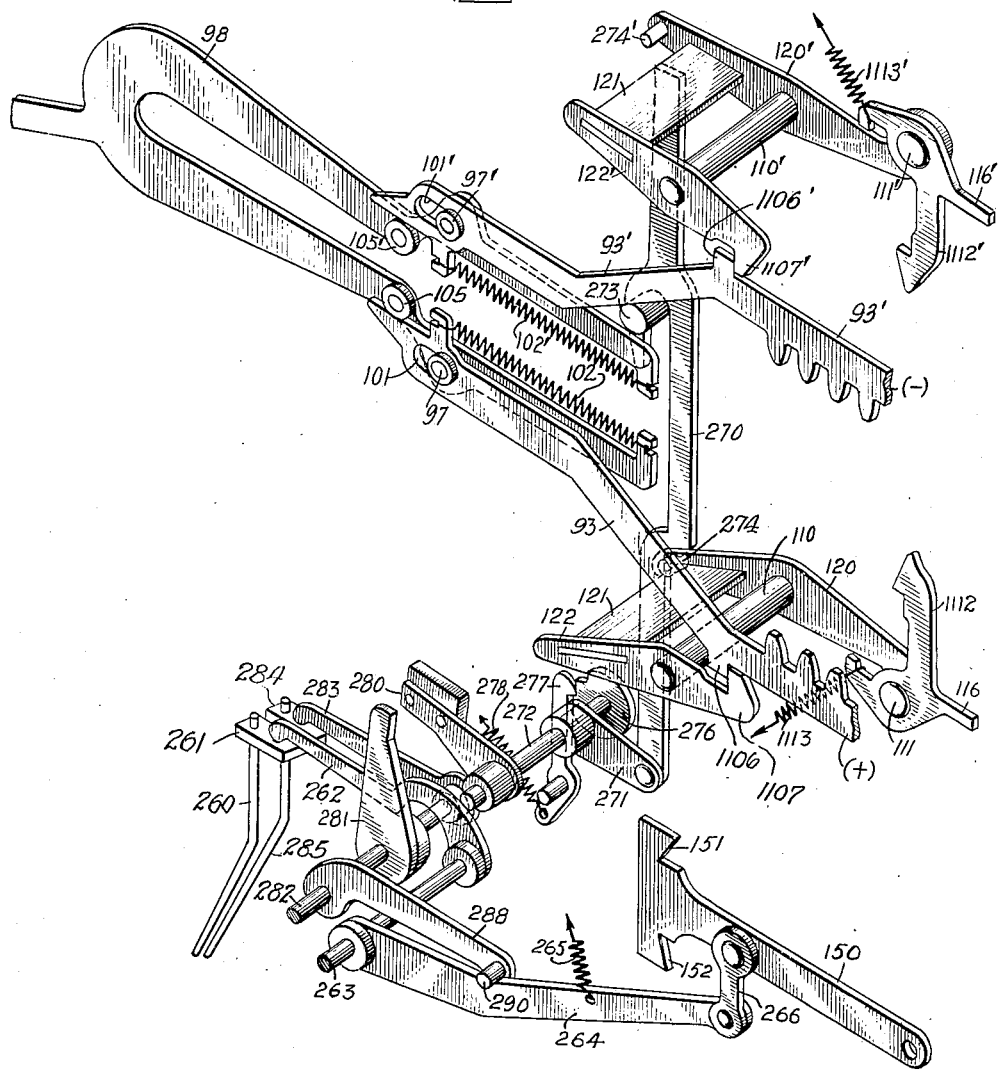

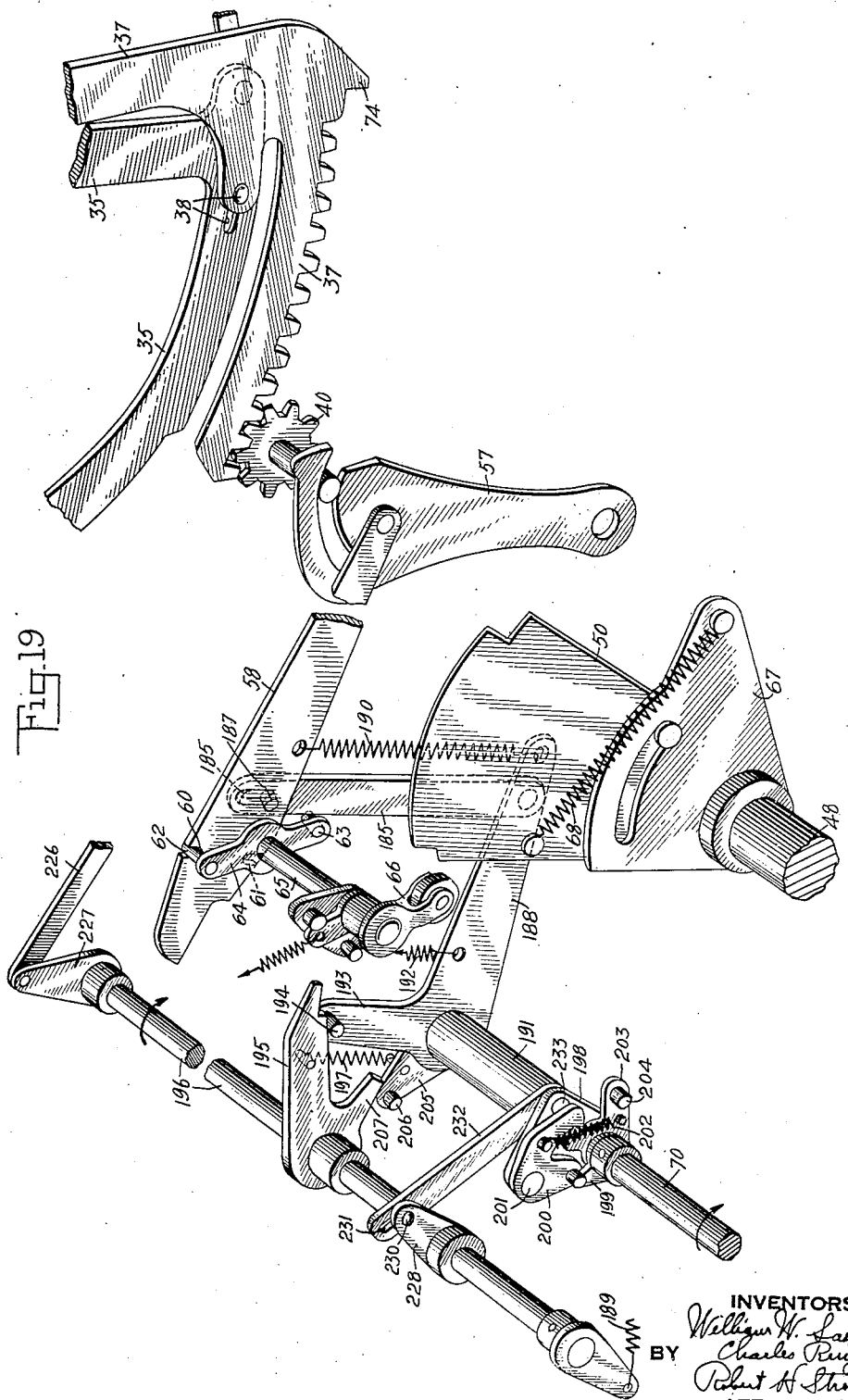

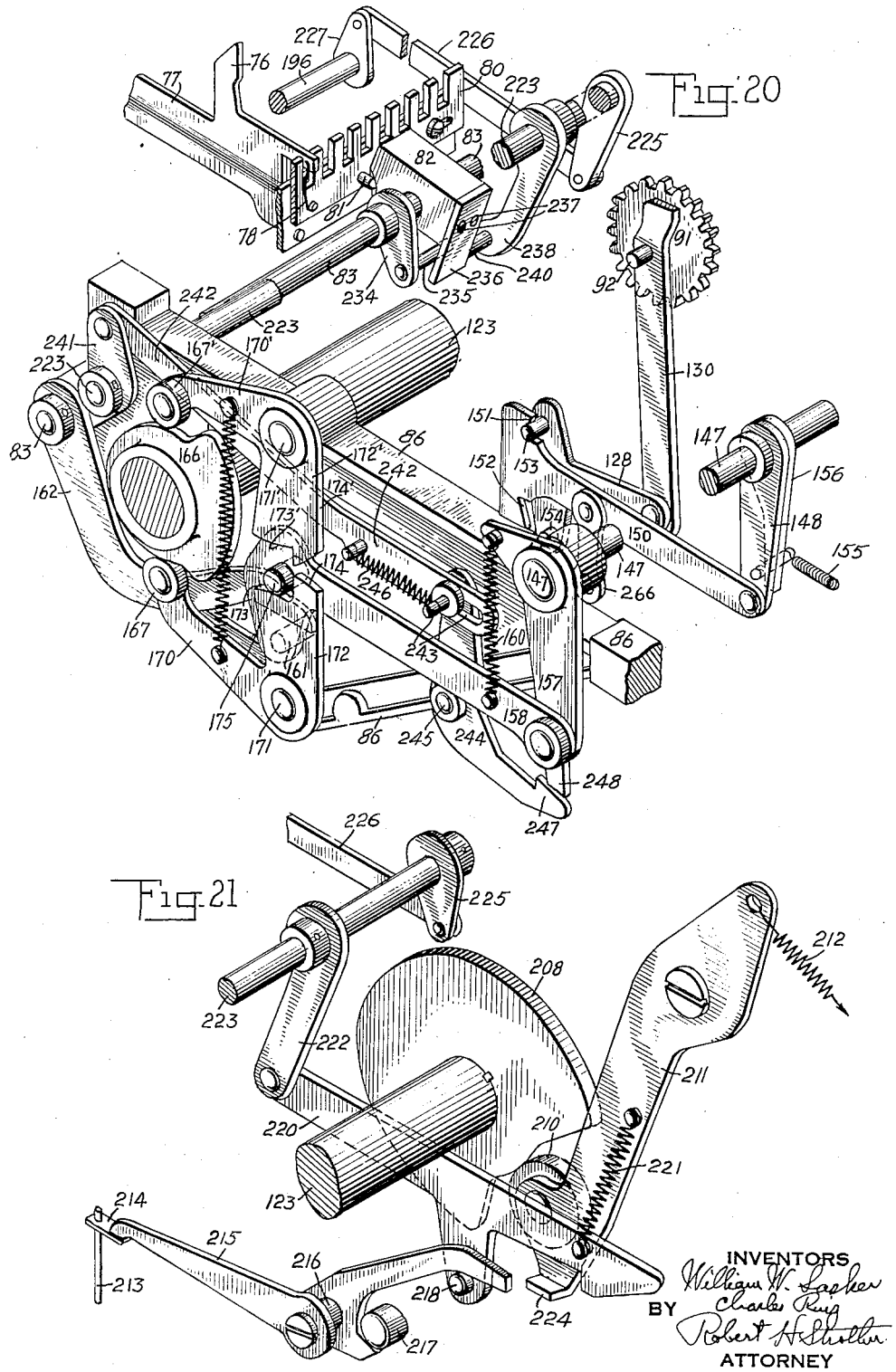

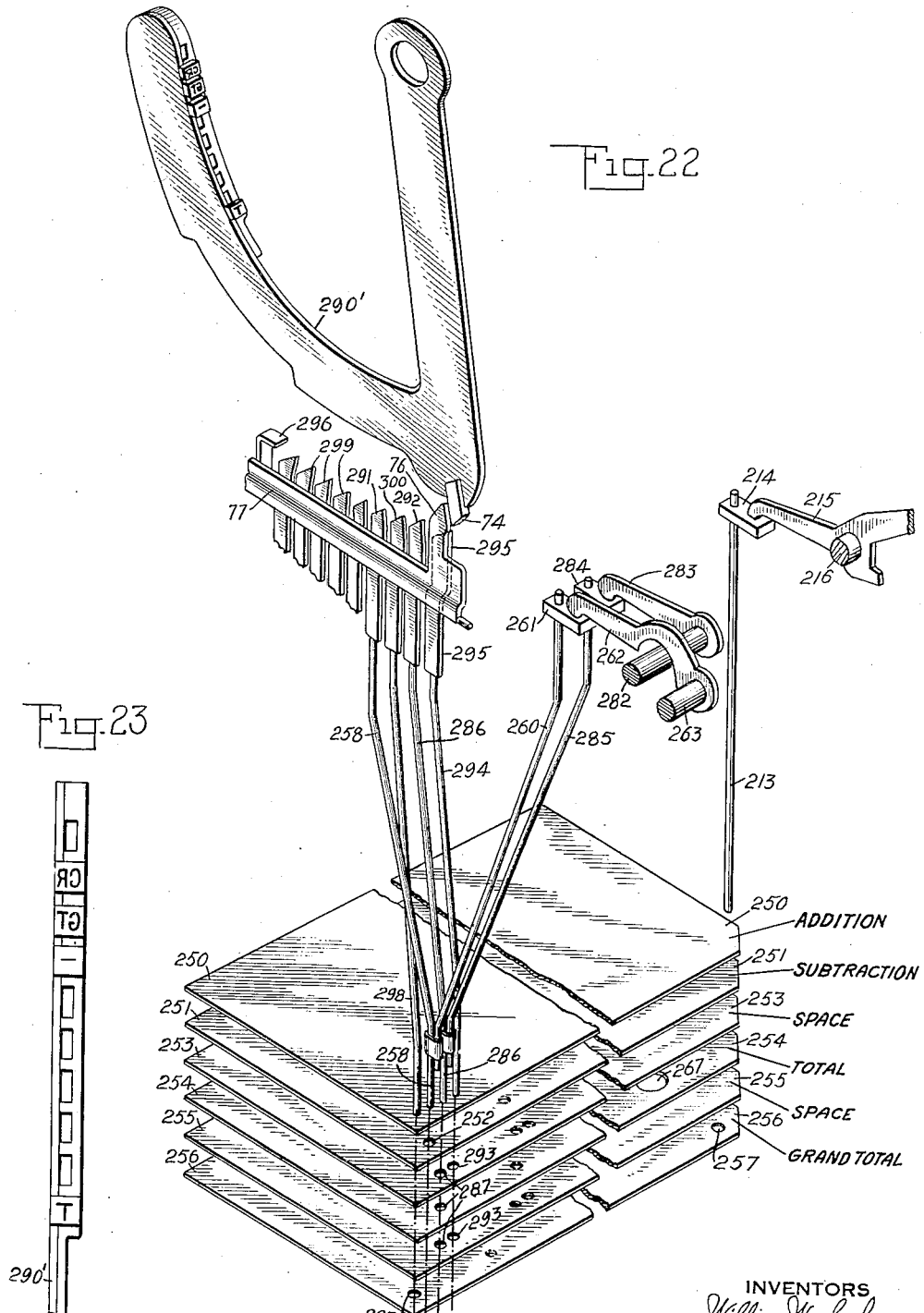

July 19, 1938.　　　W. W. LASKER ET AL　　　2,124,177
TABULATING MACHINE
Filed May 8, 1931　　　17 Sheets-Sheet 15

Fig. 24

July 19, 1938.   W. W. LASKER ET AL   2,124,177
TABULATING MACHINE
Filed May 8, 1931   17 Sheets-Sheet 17

INVENTORS
William W. Lasker
Charles Ruiz
BY Robert H. Strother
ATTORNEY

Patented July 19, 1938

2,124,177

UNITED STATES PATENT OFFICE 2,124,177

TABULATING MACHINE

William W. Lasker, Brooklyn, N. Y., and Charles Ruiz, Stamford, Conn., assignors to Remington Rand Inc., New York, N. Y., a corporation of Delaware Application May 8, 1931, Serial No. 535,842

15 Claims. (Cl. 235—61.8)

This invention relates to tabulating machines operated under the control of perforated cards.

One of the objects of the invention is to provide improved means for effecting subtraction as well as addition in a card controlled tabulator.

Another object of the invention is to provide improved means for preserving in the machine, and for printing, a grand total of a series of group totals.

Another object of the invention is to provide an improved construction in which one or more algebraic accumulating units can be mounted on and coupled to a tabulator having a plurality of adding units.

Another object is the provision of a new rotary shaft for operating the mechanism and its controls.

Another object of the invention is to provide improved automatic means for effecting direct subtraction of data contained in record cards, such means being under control of the record cards themselves.

Another object of the invention is to provide for the printing of grand totals automatically under the control of the cards.

Another object of the invention is to provide improved means for computing positive or negative balances, for printing the same, and for automatically printing a suitable mark to indicate the characteristic of the balance.

Another object of the invention is to provide improved means for automatically transferring group totals that have been inserted in one accumulator to a second accumulator that is arranged to accumulate grand totals.

Another object of the invention is to provide improved means for automatically printing special characters to identify the type of operation which resulted in the printing of certain quantities such as negative items, negative totals, positive totals, grand totals, etc.

Another object of the invention is to provide means to accumulate a plurality of positive and negative totals, and to compute and print the true grand total or net balance of said totals.

Another object is to provide novel means, under the control of record cards for predetermining special operations of the machine. Other objects will appear in the course of the following description.

The invention is capable of considerable modification. In the particular instance shown in the drawings, mechanism is applied more or less in the manner of an attachment to the existing Powers tabulator whereby the machine can be adapted for automatically performing subtraction under the control of suitably prepared record cards.

The Powers tabulator usually comprises seven units, each of which is provided with mechanism arranged to accumulate and print data contained in record cards. These units are commonly known as accumulating units and will be so termed hereinafter. According to the present invention, additional mechanism, including units arranged to accumulate both positive and negative items, is provided to condition the tabulator for effecting subtraction as well as addition. The added mechanism also includes a new drive shaft having on it the necessary cams, etc., for operating the mechanism and controlling its functions. One or more of the additional units may be readily attached to the machine and each may be connected to, and arranged to operate in conjunction with any one of the seven accumulating units. For convenience, the additional units will be termed algebraic accumulating units or algebraic units. Thus, a given tabulator may be provided with several of the usual accumulating units operating individually and several accumulating units operating in conjunction with algebraic accumulating units. In the case of the accumulating units that have algebraic units associated therewith, the controls for the regular accumulating mechanism have been modified so that these units do not accumulate items, but merely have transferred to them the group totals that are accumulated on the associated algebraic units. When grand totals are taken, all the algebraic units as well as all the accumulating units that are not associated with algebraic units are rendered inactive. Thus, the grand totals are taken only from those accumulating units that have algebraic units associated therewith.

The novel functions of this machine are preferably performed automatically under control of special perforations in record cards. The machine is so constructed that a run, or number of groups of cards may be placed in the machine, which will then perform the required functions. Thus at the end of each group of cards, the machine will automatically print the group total, and, if this be negative, mark it suitably, while at the end of the run the machine will automatically print the grand total or totals.

In the drawings Fig. 1 is a front to rear, vertical sectional view through a Powers tabulator equipped with the invention. This view shows one of the algebraic units in right-hand side elevation, the parts being in what may be called initial position.

Fig. 5 is a side elevation of the algebraic accumulator showing the position of the parts just after the beginning of a cycle in which the accumulator wheel operating mechanism is set for an adding computation.

Fig. 6 is a similar view showing the mechanism set for a subtracting computation.

Fig. 7 shows the accumulator wheel operating mechanism set for adding but during the second half of the cycle. At the end of that cycle the mechanism shown remains in this position.

Fig. 8 is a similar view showing the accumulator wheel operating mechanism during the second half of a subtracting cycle. At the end of the cycle the mechanism shown, except a certain control wire, will remain in this position.

Figs. 9 to 14 inclusive are side elevations showing a mechanism for moving the algebraic accumulator into and out of mesh with its racks. These views show a modification of certain of the mechanisms of Figs. 5–8.

Fig. 9 shows the parts in initial position.

Fig. 10 shows the parts early in a cycle in which an amount is to be added or subtracted.

Fig. 11 shows the parts about in initial position with a group total card in the machine.

Fig. 12 shows the parts at about three quarters of the cycle of taking a group total.

Figure 13:
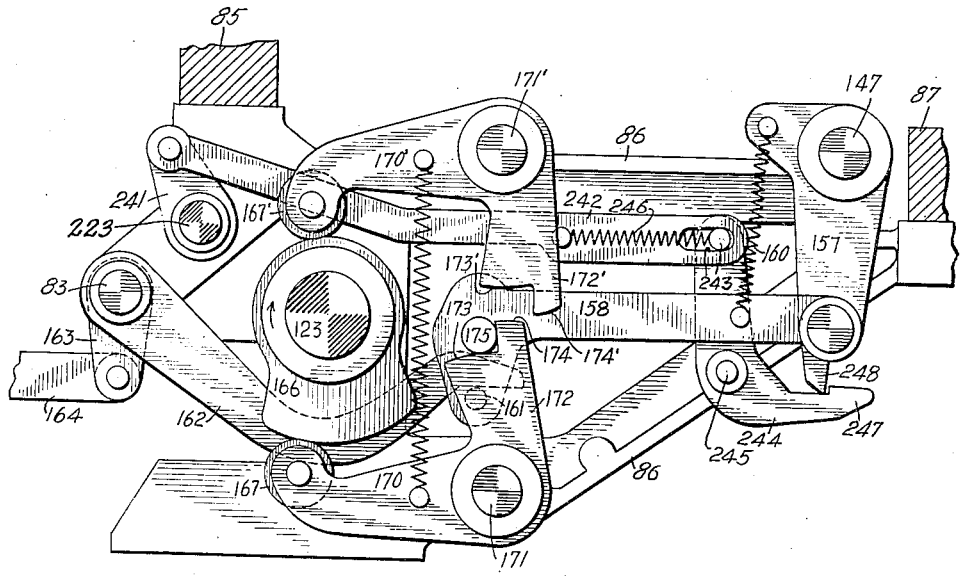
Figure 14:
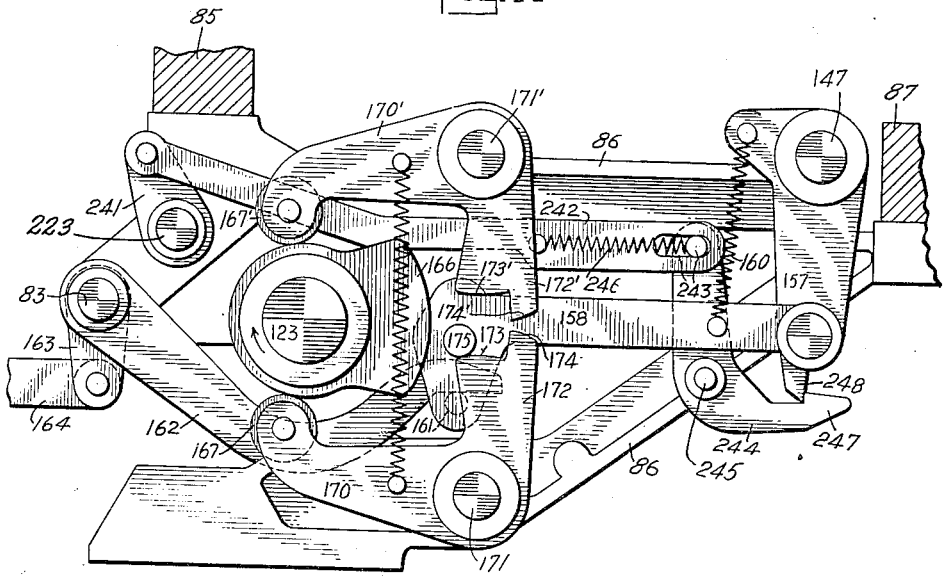

Figs. 13 and 14 show the position of the parts during the taking of a grand total. In Fig. 13 the cycle of operation has just begun and in Fig. 14 it is nearly but not quite completed.

Figs. 15, 16 and 17 are sectional views of some of the controls for taking a grand total.

Fig. 15 shows the parts in normal position.

Fig. 16 shows the operating or cam shaft in initial position but with a grand total card in the machine.

In Fig. 17 the cam shaft has just begun the grand total taking cycle.

Fig. 18 is a perspective view mainly for illustrating the credit balance or negative total mechanism, the parts being in initial position and certain parts being in the position they occupy when the algebraic accumulator shows a negative total.

Fig. 19 is a perspective view of parts of the mechanism as they stand at the end of a cycle in which cycle a group total was transferred to the grand total accumulator.

Fig. 20 is a perspective view illustrating some of the controls for the grand total accumulator and some of the total taking mechanism.

Fig. 21 is a similar view of the mechanism shown in Figs. 15 to 17.

Fig. 22 is a schematic, perspective view showing the sector for printing special characters together with its controls and illustrating how the various functions of the machine are controlled from perforations in the record cards.

Fig. 23 is a developed face view of the special type sector.

Fig. 24 is a diagrammatic view illustrating the succession of engagement and disengagement of the accumulator wheels of the algebraic unit.

Figure 25:
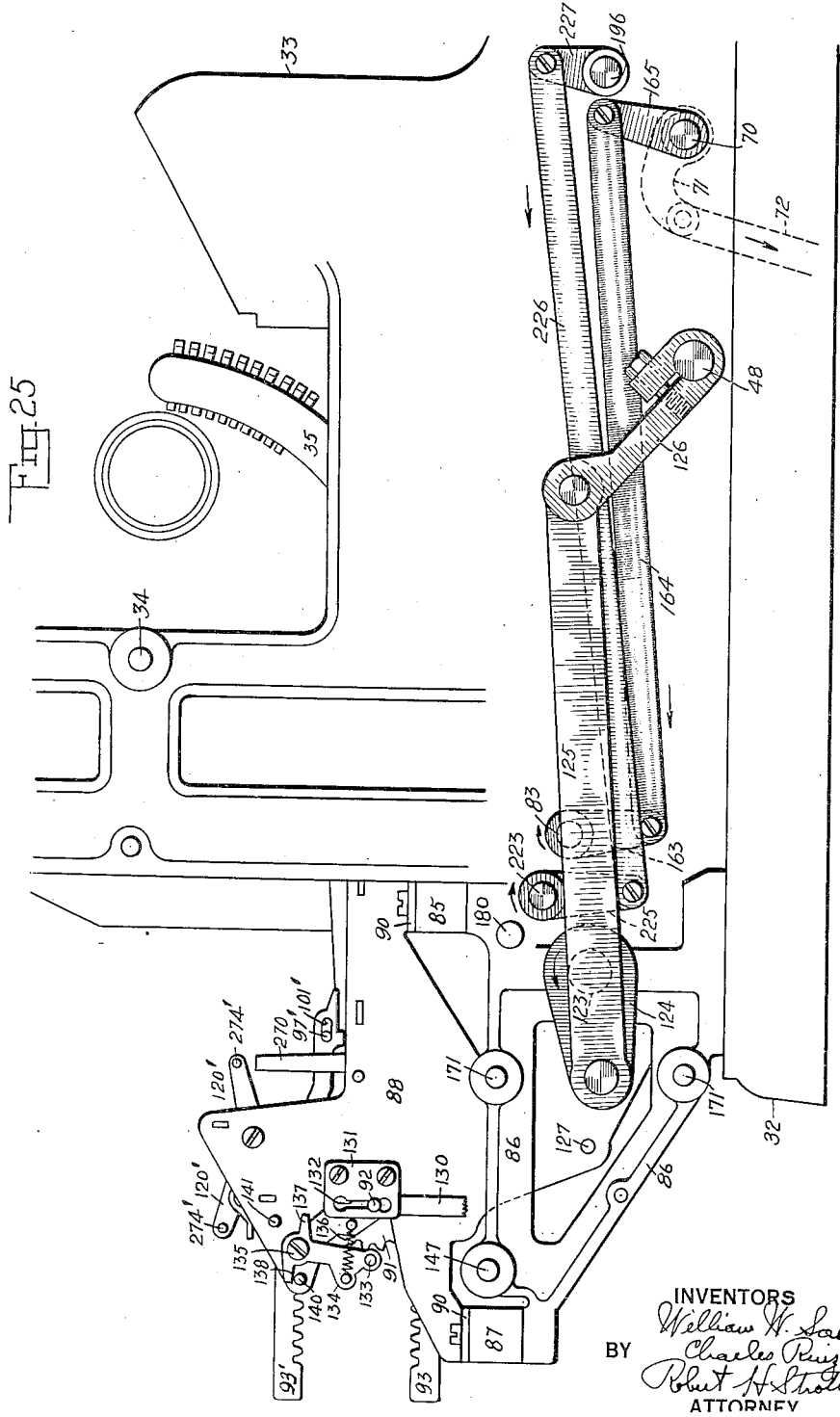

Fig. 25 is a left-hand end view of the upper part of the machine.

Figure 26:
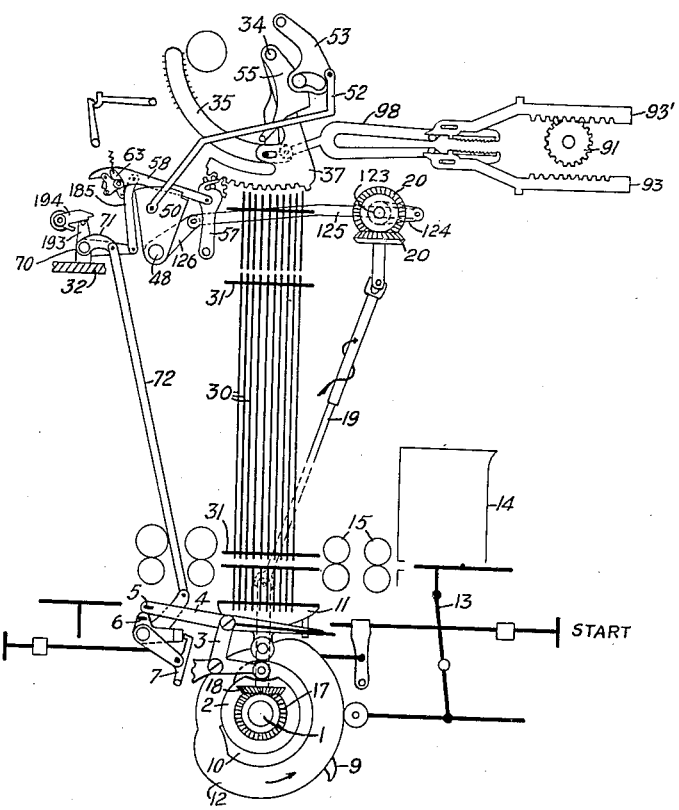

Fig. 26 is a schematic side elevation of the machine.

The invention is shown applied to a Powers tabulator of the kind that has been manufactured and sold for a number of years, and an early form of which is described in the patent to Powers No. 1,245,502, November 6, 1917. The machine shown in that patent has been modified considerably as shown, for example, in Powers Patents Nos. 1,245,504 and 1,245,506, November 6, 1917, in the Lasker Patent No. 1,376,555, May 3, 1921, and in other patents. The machine comprises a base containing an electric motor which continuously rotates a main drive shaft 1 (Fig. 26) which also serves as a cam shaft; a card magazine 14; card feeding mechanism including picker mechanism 13 driven by cam 12; feed rollers 15, driven in the usual manner by shaft 1; card sensing mechanism 11, operated by cam 10 on shaft 1; and total taking control mechanism operated by cam 2 on shaft 1, etc. The sensing mechanism includes a pair of perforated plates between which the cards are automatically inserted and a pin box which is elevated once at each rotation of shaft 1, the pins being spring-pressed upwards through perforations in the card. All operations or cycles of the machine irrespective of their regular or special character are controlled by corresponding cards. For the sake of definiteness, the sensing mechanism may be conveniently identified as "continuously reciprocable record sensing means" (e. g. that shown in Patent No. 2,044,119) in contrast to somewhat similar sensing means which is locked against operation during cycles other than regular accumulating cycles. If no card is in the sensing mechanism the machine automatically stops as is more fully described in Patent No. 1,245,502. The pins of the sensing mechanism operate a set of wires 30 arranged in the well known manner in the usual connecting box 31 which is detachably mounted in the machine. This connecting box occupies the space above the base of the machine and beneath what is called the "head" of the machine. The head, which contains the computing and printing mechanism, comprises a base plate 32, which, in order to facilitate the insertion and removal of the connecting box, is hinged in a known manner to the lower frame work of the machine, and end brackets or frame pieces 33 (Figs. 1 and 25) which are connected together by various frame rods and bars. We have added to the mechanism in the head, a cam shaft 123 which, like the main shaft 1, makes one rotation during each cycle of machine operation. Shaft 123 is driven from shaft 1, but in the opposite direction by miter gears 17 and 18 (Fig. 26), telescopic shaft 19 and miter gears 20. Since shafts 1 and 123 are not in the same vertical plane, universal joints are used to connect shaft 19 with the gears 18 and 20. Shaft 19 is telescopic, as stated, in order to permit the head to be tilted when changing connection boxes. In the framing of the head, a series of tabulating units is mounted side-by-side. The machine usually manufactured contains seven of these units, each unit comprising its own pair of side plates 33 (Fig. 1) in which the mechanism is mounted, as is well known in the art and is specifically shown in 7a, 7aa of Fig. 2 of the patent to Powers 1,245,502. Each such unit includes a supporting shaft 34 on which are mounted a suitable number of type sectors 35 carrying slidable types 36. Gear sectors 37 are connected with each type sector 35 by the usual pin and slot connections 38. The series of accumulator wheels 40 of each unit is mounted on a shaft 41, which, in turn, is mounted in arms 42 pivoted at 43. At this point are also pivoted the usual transfer levers 44 which cooperate with pins 45 on gear sectors 37. The type sectors 35 are controlled by the usual springs 46 and are connected with gear sectors 37 by the usual springs 47.

The main rock shaft 48 has for each unit a resiliently connected crank cam sector 50 having pivoted thereto at 51 a link 52 which is pivoted to a cam piece 53 which by follower roller 54 operates the restoring frame consisting of side arms 55 and cross bar 56, the last lying in contact with the type sectors 35.

The accumulator in each unit is moved into and out of mesh with the racks 37 by the usual rocker cam arms or camming hooks 57 (see also Fig. 19) controlled by the pitman 58 having the upper notch 60 and the lower notch 61 cooperating respectively with pins 62 and 63 on an intermittently rocking piece 64, which is rigid with a rock shaft 65 and controlled by the usual follower arm 66 (Fig. 19) operated by the crank or fan cam 50, all as well known in the art. Said fan cam 50 is here shown flexibly connected with the shaft 48 through means including an arm 67 fast on the shaft and a strong spring 68 to prevent breakage in case the mechanism is for some reason unable to operate.

The machine includes the usual total shaft 70 having an arm 71 (Figs. 1 and 26) connected to and rocked by a link 72. This link is controlled for total taking purposes by mechanism similar to that shown in the Lasker Patent No. 1,376,555; but the mechanism controlled by this shaft has been modified for the purposes of the present invention as will be hereinafter described.

The main drive shaft 1 (Fig. 26) has thereon a cam 2 which oscillates the bell crank 3 to reciprocate the total card controlled walking beam 4. If a total card is not present the walking beam stud 5 fails to align with the companion stud on the total-setting bell crank 6. If no card is present in the machine, the stud 5 passes below its companion, and if a card other than a total card is present, it passes above. If a total card is present, the studs are in alignment. Then bell crank 3 through the walking beam and cooperating studs quickly rocks bell crank 6 sufficiently to permit latch 7 to lock it in operated position. Said bell crank 6 draws link 72 downwardly.

Figure 1:
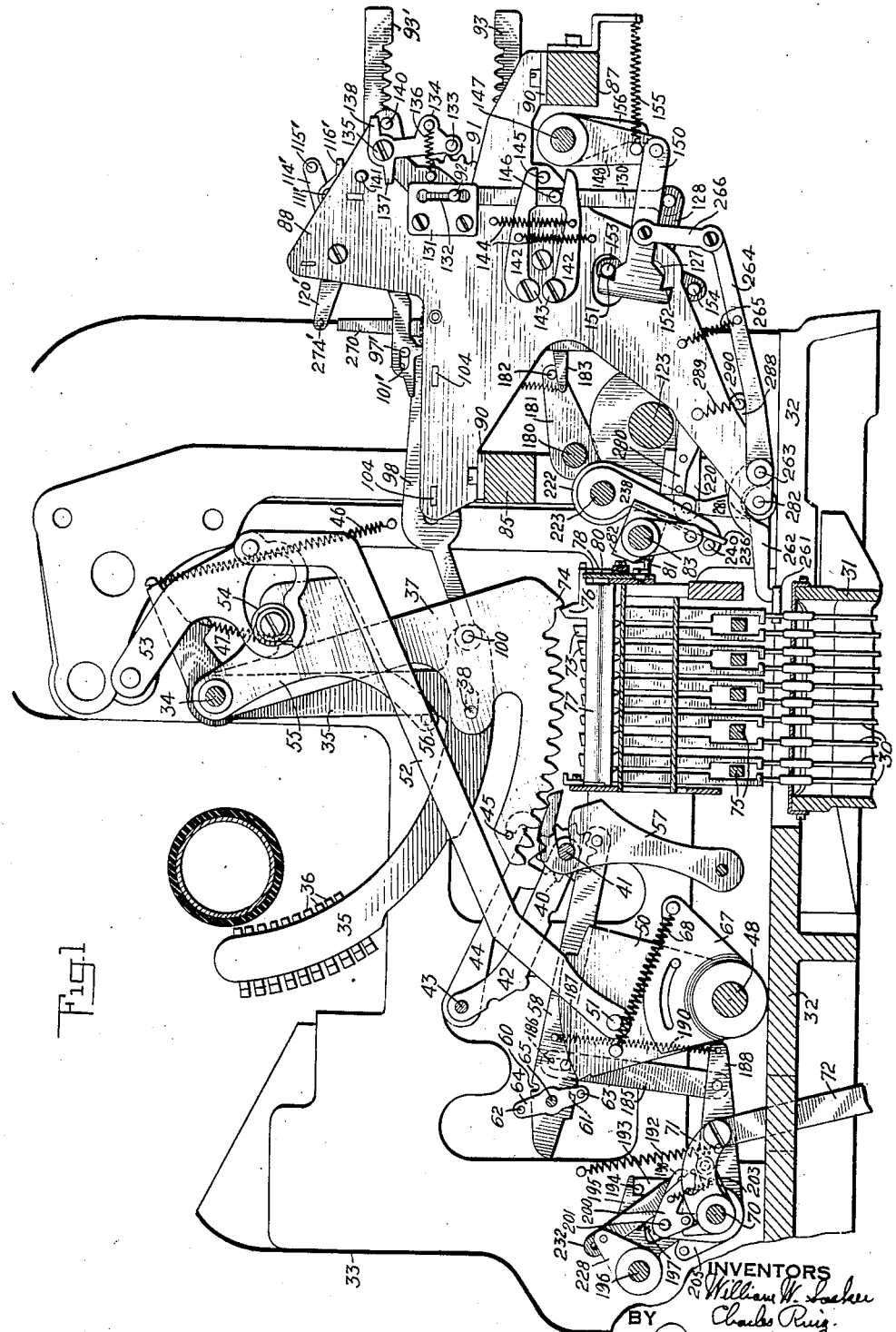

The machine also includes, for each unit, the usual stop basket including a set of digit stops 73, each adapted to be projected upward into the path of a lug 74 on the appropriate rack 37, these stops 73 being operated by the wires 30 and restored by the usual bars 75. Zero stops 76 are mounted on the usual pivoted shutters 77, said stops being cammed aside by any projected stop 73 and restored to normal position by usual springs 78 (as best shown in Figs. 1, 20 and 22).

In total taking operations all of the stops 76 are moved out of the paths of the lugs 74 by slide bars 80 (Fig. 20) one for each unit and each having a stud 81 projecting into the path of an inclined or cam surface on a block 82 mounted on a rock shaft 83. In the machine as heretofore manufactured all of these blocks 82 are fast on the shaft 83 and when the latter is rocked all of the sectors are freed for total taking. In the present machine, those of the blocks 82 which are associated with algebraic units are made loose on the shaft and are operated by means to be described hereinafter.

It is contemplated that the invention may be applied, if desired, only to certain of the units, and not to others. The cam blocks will be fast on the shaft 83 in the case of each unit that is not provided with the present improvements and the block will be loose on the shaft, but held against end-wise motion along the shaft, in the case of each unit that is provided with the present improvements.

The rock shaft 83 is operated from the shaft 70 in the usual manner comprising a link 164 (Fig. 25) connected to arms 163 and 165 fixed on the respective shafts.

According to the present invention, an algebraic accumulating unit is mounted behind and connected with any desired one of the accumulating units. The operation of the algebraic unit is controlled, in respect to the amounts inserted in it, by the accumulating unit to which it is connected and in other respects, is automatically controlled in a manner described hereinafter. In the present instance, the various functions of the mechanism are controlled by special perforations in the cards, but they or some of them may be controlled automatically from the cards in other ways.

The Powers tabulator as ordinarily constructed includes a heavy frame bar 85 at the rear of the head, which bar is supported from the base plate 32 by two posts. In the present instance these posts are replaced by brackets, or end frame pieces 86, (Figs. 20 and 25) each of which is secured to the base plate 32, and has the bar 85 secured to its upper part. These brackets extend rearward and support a second frame bar 87. Between these brackets there is supported a quantity of new mechanism which will be described.

The adding and subtracting mechanism is made up in units which for convenience may be termed "algebraic units." Each of these comprises right and left frame plates 88 having ears 90 bent off therefrom and secured to the bars 85 and 87 by screws. The two frame plates 88 are secured together by cross bars 104 and the various shafts of the unit assembly, as will presently appear. Since bars 85 and 87 are continuous members and extend across the rear of the computing section, it is possible to include algebraic units in any number of computing units.

Figure 2:
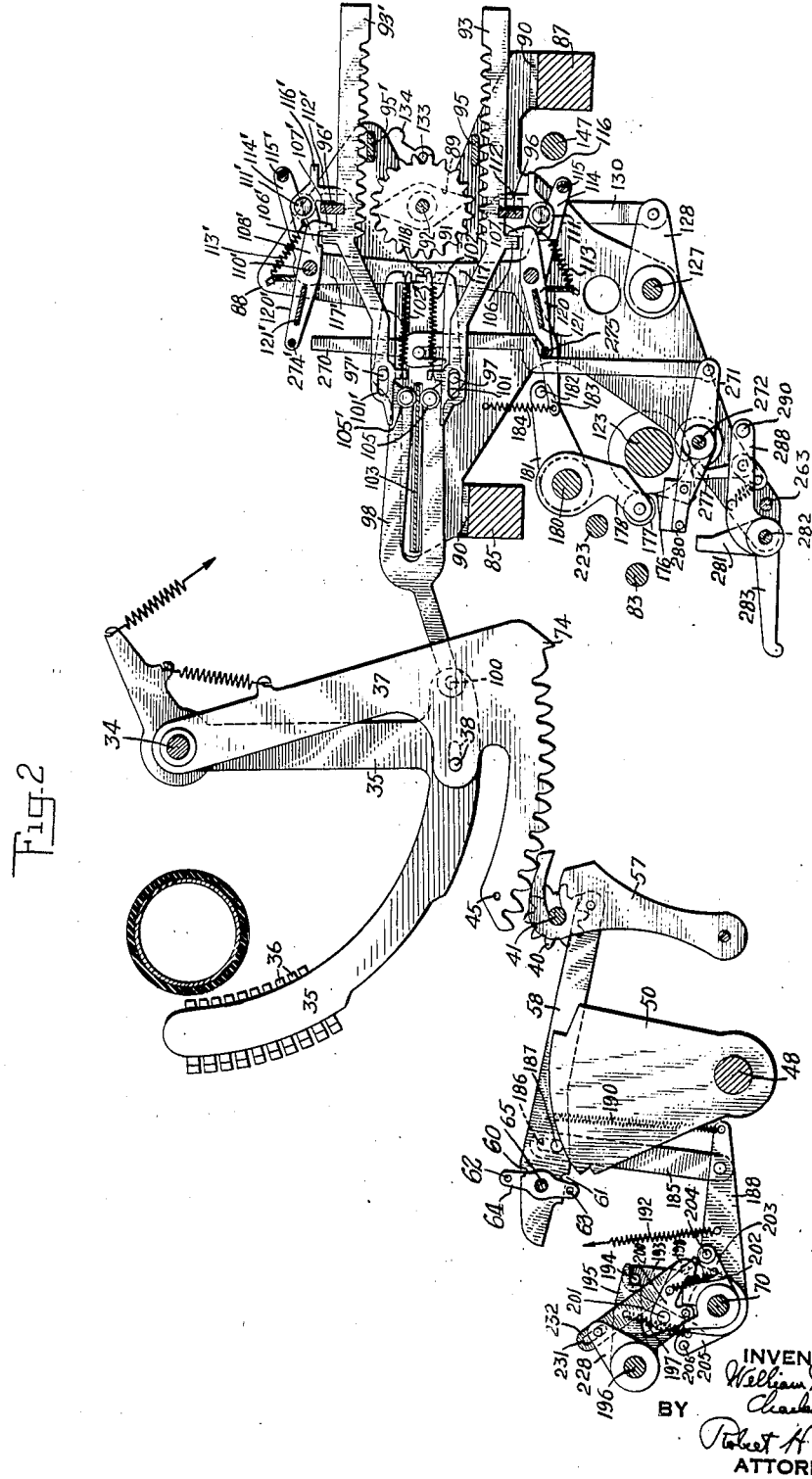
Fig. 2 is a similar view of some of the parts, but with the algebraic unit in section and showing the mechanism soon after the initiation of a cycle in which an item is to be added or subtracted.

Referring, for example, to Fig. 2 which shows a section through one of the algebraic units, it is seen that said unit comprises a set of accumulator wheels 91 mounted on a shaft 92 which can be moved vertically. These are shown as twenty-toothed wheels, each wheel having a two-point transfer or carry tripping piece 89 rigid therewith. These wheels are operated additively by a lower rack bar 93, and subtractively by an upper rack bar 93' and are moved to a neutral position midway between these bars as shown in Fig. 2 by the actuation of link 130. The rack bars are prevented from moving vertically by cross bars 95, 95' and 96, 96' between which they move and are prevented from moving sideways since they lie in grooves in bars 96, 96' as is best shown in Fig. 2. The rack bars are resiliently connected by elongated slots 101, 101', pins 97, 97' and springs 102, 102' with the upper and lower tines of a bifurcated link 98, which in turn has its forward end pivoted at 100 to the appropriate one of the type sectors 35. Hence, each pair of racks 93 and 93' reciprocates in unison with the oscillations of its associated sector 35.

In order to guide the rear ends of the links 98, a fixed doubly grooved guide plate 103 (Fig. 2) constrains the movement of said fork tines. Rollers 105, 105' on the upper and lower tines of the link register with correspondingly located grooves in said plate.

Provision is made for tens transfer, by forming the respective racks 93 and 93' with slotted holes 101 and 101' which engage pins 97 and 97' situated respectively in the lower and upper tines of link 98 and springs 102 and 102' which are stretched between suitable anchors situated respectively on each tine and on its associated rack.

If no transfer occurs during an operation of a wheel 91, the actuating rack 93 or 93', as the case may be, is arrested when the integral projection 106, 106' thereon contacts with the movable stop 107 or 107' associated with the wheel of the next inferior denominational order, as shown in Fig. 2.

The transfer mechanism is duplicated, the one for the adding racks 93, the other in mirror reverse for the subtracting racks 93'. Therefore, a description of one will suffice for both. The transfer mechanism, which will be briefly described, is similar to that fully shown and described in Patent No. 1,965,611, issued to O. S. Sundstrand on July 10, 1934.

Each stop 107 is integral with a spring urged arm 108 pivoted on cross-shaft 110. Pivotally attached at 111 to the free end of each of the arms 108 is a latch 112 guided by a groove in the rear of bar 96. A spring 113 attached to latch 112 holds the latter in engagement with the bar 96 and also urges the arm 108 clockwise. Necessary clearance is provided by rabbeting arm 108. The two-point transfer or carry tripping piece 89 is provided with a tooth or camming surface cooperating with a mating tooth or camming surface on the latch 112 so that when wheel 91 is being rotated on the return movement of the rack, latch 112 may be disengaged, with a smooth gear tooth action from 96 against the tension of spring 113. Then spring 113 is free to rock arm 108 an extent determined by the normal position of the transfer restoring cross-bail 115 (Fig. 2) and thus move 107 out of the path of 106 so that spring 102 will effect the transfer in the well-known manner, as disclosed, for example, in the above mentioned Sundstrand patent. When the wheel 91 is reversely rotated as in total taking, it is positively stopped when member 89 contacts with the tooth of 112 because further movement is blocked by the fixed bar 96, as shown in the case of a negative total in Fig. 3.

Transfer restoring cross-bail 115 (Fig. 2) is mounted between arms 114 of the two pin-connected normally ineffective bell-cranks 114—117 (the bell cranks are pivoted on rod 110, one lying adjacent each plate 88). Transfer restoring bail 115' is similarly mounted between arm 114' of the upper bell cranks 114'—117'. The bell cranks 114—117 and 114'—117' operate in unison by virtue of the pin and fork connections at 118. One of the lower bell cranks 114—117 (the one shown in Fig. 2) is provided with an extension 183 lying below a pin 182 on an arm 181 rigid with the shaft 180. Shaft 180 is oscillated by an arm 178 rigid therewith through the medium of a cam 176 rigid with the shaft 123. Motion in the reverse direction is effected by the tensioned spring 184. Said bellcranks are operated near the mid-point of the operating cycle to cause bails 115 and 115' to come in contact with fingers 116 and 116' respectively, thus forcing transfer latches 112, 112' to return to normal position against the tension of their springs 113—113'.

When the accumulator wheels pass through zero, the amount standing thereon would be incorrect by an amount one (1) if special mechanism were not provided. This is now well recognized in the art as the "fugitive unit" and the cause of its existence is well-understood. Further, it is also well-known that the fugitive unit is properly entered by providing a closed cycle carrying mechanism. Such mechanism is illustrated in Fig. 18. The latch 1112 associated with the highest order accumulator wheel is mounted on a special arm 120 which is rigidly connected by a bail 121 with a stop arm 122 identified with the lowest denominational actuating rack. The corresponding stop 1107 cooperates with a lug 1106 on the units order wheel actuator. This mechanism is provided in mirror image duplicate, the one for the adding racks, the other for the subtracting racks. Latches 1112 and 1112' of the credit balance mechanism stop reverse rotation of the accumulator wheels in total taking, and this mechanism is restored to normal, when tripped, by the action of the cross-bails 115, 115' coacting with fingers 116, 116' in the manner described above. The construction and arrangement of this mechanism is such that when the accumulator wheel of highest order passes from nine to zero, or vice versa, 1 (one) will be added to the wheel of lowest order. This mechanism is similar to that which is fully disclosed in French Patent No. 625,678, published August 17, 1927 (see page 6, line 41 to page 7, line 42, inclusive, of said patent) and, therefore, a brief description of operation will suffice herein.

Assuming that a positive total has been taken from the rear accumulator, the wheels 91 stand at zero and are engaged with racks 93 (i. e., one of the teeth on each of the transfer pawls 89 contacts the rearward face of the associated latch 112) at the beginning of the next cycle. If, during the succeeding cycle, −1 (minus one) is to be added, wheels 91 are disengaged from racks 93 and shifted to a neutral position (as in Fig. 2) prior to the forward movement of type carriers 35, and then are shifted upwardly to engage with racks 93' prior to the return of the type carriers. Thus, the diametrically arranged tooth on each pawl 89 contacts the forward face of the associated latch 112'. Then as the type carriers 35 are returned, the "units" type carrier, which has advanced one step beyond its zero position, shifts the "units" subtracting rack 93' rearwardly one tooth space whereat projection 106' is held by stop 107'. As the type carriers are returned to their rearmost position, each pin 97' is moved to the rear end of its slot 101', thereby tensioning springs 102'. However, the movement of the units rack 93' rotates the "units" wheel 91 one tooth space in a clockwise direction and pawl 89 thereon trips latch 112'. The release of latch 112' allows spring 113' to rock the associated arm 108' and raise the stop 107' from the path of the projection 106' of the "tens" subtracting rack 93' and allows the associated spring 102' to shift the "tens" rack rearwardly one tooth space. This movement of the "tens" subtracting rack 93', in the same manner, causes a similar movement of the "hundreds" rack 93' and so on, to the highest denominational order. When the wheel 91 of highest order is rotated, it trips latch 1112' (Fig. 18), which, in turn, by means of spring 1113', lever 120', shaft 110', and lever 122', elevates stop 1107' from the path of projection 1106', of the units rack 93' and allows spring 102' to shift the "units" rack rearwardly to insert the "fugitive one" in the "units" wheel 91. At the completion of this cycle of operation, all wheels 91, except the "units" wheel, stand at "negative zero", i. e., a tooth, on the associated transfer pawl 89 of each, contacts the rearward face of the associated latch 112'. The "units" wheel stands at negative one, i. e., it has been rotated an additional tooth space in a clockwise direction by the closed cycle carrying mechanism.

If a total is taken at this time, wheels 91 are engaged with racks 93' during the forward movement of the type carriers and the true negative total or −1 is rolled out of the rear accumulator and printed on the report sheet. At the end of this operation, the wheels stand at "negative zero", i. e., one of the teeth on each pawl 89 contacts the rearward face of the associated latch 112'. In the event the succeeding items to be entered in the wheels are of negative characteristic, they are accumulated in the same manner as positive items except that the wheels are engaged with the subtracting racks 93'.

If, however, the succeeding item is positive, the sequence of operations is identical to that described in the penultimate paragraph, except that the operations are performed by the mechanism associated with the adding racks 93. As has been noted, the wheels stand at negative zero at the end of a negative total taking operation. Thus, when they are engaged with racks 93 to accumulate a positive quantity, all the wheels, in fact, stand at nine, i. e., one of the teeth on each of the pawls 89 contacts the forward face of the associated latches 112. However, as the positive number is rolled in, the closed cycle carrying mechanism of the adding racks is operated as above and the amount standing on the wheels at the end of this operation represents the true positive amount with regard to the adding racks.

The term "negative zero" has been used herein to indicate the relative position of the accumulator wheels 91, with regard to either set of actuating racks, at the end of a negative total taking operation, to distinguish this condition from that existing at the end of a positive total taking operation. As will be more fully explained hereinafter, when the total of the amounts rolled into the wheels 91 is positive, the wheels are automatically engaged with racks 93 during a total taking operation, and are rotated clockwise until a transfer pawl 89 on each contacts the rearward face of the associated latch 112. Thus, the wheels 91 are cleared with reference to the adding racks 93 and stand at "positive zero" after a positive total has been taken. However, when the total of the amounts rolled in the wheels is negative, the wheels are automatically engaged with racks 93' during a total taking operation, and are rotated counter-clockwise until a transfer pawl 89 on each contacts the rearward face of the associated latch 112'. Thus, wheels 91 are cleared with reference to the subtracting racks 93' and stand at "negative zero" after a negative total has been taken. In either case, it will be noted that wheels 91 stand at "9" with reference to the opposite set of actuating racks. Thus, the term "positive zero" has been used to describe the position of the accumulator wheels after a total taking operation in which they have been engaged with the adding racks 93, i. e., the wheels stand at "0" with reference to racks 93, and at "9" with reference to racks 93'; whereas the term "negative zero" has been used to describe the position of the accumulator wheels after a total taking operation in which they have been engaged with the subtracting racks 93', i. e., the wheels stand at "0" with reference to racks 93' and at "9" with reference to racks 93.

The credit balance mechanism, (see also Fig. 18) through the movement of either arm 120, 120', shifts the credit balance switch bar link 270 either upwardly or downwardly by means of the pins 274 (cooperating with a shoulder on 270) or 274' (cooperating with the upper end of 270) to correspondingly rock shaft 272 by means of an arm 271 mounted rigidly thereon to modify the normal action of the accumulator timing mechanism by moving an interponent 280 into the path of arm 281 as will be more fully described hereinafter. A detent device for holding shaft 272 in either of its alternative positions is provided. This device comprises a disc 276 fixed to shaft 272 and formed with two notches on its periphery capable of coacting with a spring-urged frame-supported detent pawl 277. As shown in Fig. 18 the credit balance mechanism is set preparatory to taking a negative total.

Shaft 123 is journaled near its ends in the frame brackets 86 and, therefore, constitutes a part of the mechanism which is more or less in the nature of an attachment to the regular Powers machine. This shaft is utilized to rock shaft 48 as shown in Fig. 25 in place of the connections heretofore used for that purpose. A crank 124 on the shaft 123 operates a connecting rod 125 pivoted to an arm 126 on the shaft 48 in order to rock the latter.

A complete rotation of the main drive shaft 1 and of the shaft 123 constitutes a cycle of operation of the machine. Many of the figures, such for example as Figs. 1, 2, 9, 11, 15, 16, 20 and 25 show the parts in about the position they occupy when the machine stops, the drive shaft being arrested at a certain point in its rotation by well-known means; and it will be convenient to refer to this position as the normal position of the parts and as the beginning or end of a cycle, although the selection of this particular position as the beginning of a cycle is more or less arbitrary. In this normal or initial position, the crank 124 (Fig. 25) is but slightly past its rearmost dead center point so that the shaft 48 has revolved counter-clockwise (as viewed in Fig. 25) substantially as far as possible. The parts fastened to shaft 48, e. g., fan cams 50, (see Fig. 1) are substantially in their rearmost positions. At this particular moment, a card has already been fed into the sensing mechanism, the pin box has been elevated, and therefore the connecting wires 30, stops 73 and other parts to be hereinafter described, as controlled by perforations in the card, are in their elevated positions and the restoring bars 56 are all in their rearmost positions. In Fig. 26, a space is shown between the wires 30 and the pins in the box 11, to represent the space occupied by a card.

Mechanism is provided for shifting shaft 92, upon which the algebraic accumulator wheels are mounted. This mechanism comprises a rock shaft 127, Figs. 2 and 5–8, journaled in the side plates 88 of the unit and having at each end an arm 128 projecting rearwardly therefrom. Each of these arms has pivoted thereto an upstanding post 130 lying on the outer surface of the plate 88 and at its upper part having the shaft 92 passing through it so that if the shaft 127 be rocked, the posts 130 will cause said shaft 92 to be shifted. Near its upper end the post 130 is guided between the plate 88 and a cheek plate 131 secured to the plate 88 by screws. The end portion of the shaft 92 is made with a peripheral groove which is guided in a key hole slot 132 in the plate 131.

In order to guard against accidental rotation of the accumulator wheels when they are not in mesh with the actuating racks, an aligner is provided.

To this end, each post 130 is formed with an upwardly and rearwardly extending portion to which is pivoted a resiliently urged arm 134. The lower ends of said arms 134 carry a universal rod or bar 133 which is located in a position such that the bar will fit between adjacent teeth of the accumulator wheels 91 so as to lock them against accidental movement. The bar 133 is resiliently urged to wheel-locking position by a pair of springs 136 extending between studs on arms 134 and studs on the posts 130. Each arm 134 is provided with fingers 137 and 138 which are formed to contact respectively, studs 141 and 140 rigid with the adjacent side frame of the algebraic unit.

When the posts 130 are lowered to bring the wheels 91 into engagement with the lower racks as shown in Figs. 1 and 7, the fingers 138 are blocked by pins 140 thus withdrawing the bar 133 from locking position. When the posts are elevated to bring the wheels into engagement with the upper racks as in Fig. 8, the fingers 137 interfere with pins 141 to similarly withdraw the bar 133. Hence, if the accumulator wheels 91 are either elevated or depressed the interference of fingers 137 or 138 with the said studs 141 or 140 causes the bar 133 to be withdrawn from locking engagement whereas, when the wheels are in their middle position the bar 133 locks them against rotation. It should be noted that springs 136 are tensioned in either position and therefore their reaction tends to restore the wheels to intermediate, inactive locked position.

Each post 130 is provided with a stud or pin 146 near its midpoint. Said pin 146 is substantially horizontally positioned with relation to a stud 145 fixed to the side frame of the algebraic unit, when the accumulator wheels are in mid-position as shown in Figs. 5 and 6. When the accumulator wheels are lowered, pin 146 rocks resiliently urged arm 142 tensioning spring 144 attached thereto as shown in Fig. 7. Similarly when the accumulator wheels are elevated, pin 146 rocks resiliently urged arm 142 upwardly tensioning the spring 144 attached thereto. Thus, in either raised or lowered position, one or the other of the two springs 144 is tensioned and the one or the other will tend to shift the accumulator wheels to their mid-position.

The spring 144 attached to the lower arm 142 is appreciably nearer pin 146 than is the corresponding spring of the upper arm. Therefore, this spring, if weight is neglected, effects a stronger restoring action than the other spring but when the weight is taken into consideration, the restoring effect of both springs is substantially equal.

The means for rocking the shaft 127 and thereby moving the accumulator wheels into or out of engagement at suitable times comprises a rock shaft 147 journaled at its ends in the brackets 86 and having an arm 148 thereon adjacent each algebraic unit as shown in Figs. 5–8. Pivoted to the lower end of the arm 148 is a pitman or link 150 having an upper hook 151 and lower hook 152. The arm 128 on the shaft 127 is a part of a three-armed lever whose upwardly extending arm carries a stud 153 and whose downwardly extending arm carries a stud 154 adapted respectively to be operated by the hooks 151 and 152 depending on whether the pitman 150 occupies its upper position, shown in Fig. 5, or its lower position, shown in Fig. 6. The arm 148 is drawn rearwardly by a strong spring 155 tensioned between stud 1480 and hook 1550 and capable of overcoming the springs 144 and 136. It will be perceived that if the pitman 150 is in its upper position, shown in Fig. 5, and the spring 155 is permitted to draw it rearwardly, then the pitman will pull the accumulator wheels downward into engagement with the lower racks 93 for positive or additive operation, and that if the pitman 150 occupies its lower position, shown in Fig. 6, it will push the accumulator wheels upward for a negative or subtractive operation. The arms 148, one for each algebraic unit, are loose on the shaft 147 and each has its individual spring 155. Each arm 148 is normally held in its forward position by an arm 156 fast on the shaft 147 which shaft is held in the position shown by means that will presently be described, but is released at the proper time to allow engagement of the accumulator wheels selectively with the one or the other of its sets of racks. The whole construction is such that if shaft 147 be rocked clockwise to the position shown in Figs. 5 and 6, pitman 150 will occupy its forward position and the accumulator wheels will be disengaged from the racks; and if the shaft 147 be rocked counter-clockwise to the position shown in Figs. 7 and 8, the wheels will be moved into engagement. The time when the accumulator is engaged with its racks depends upon the rocking of the shaft 147, and whether the accumulator wheels shall be set for a positive or a negative operation depends upon the position of the pitman 150 at the time the shaft is rocked. The times when the shaft 147 is rocked depend on whether the operation is to be a computing or a total taking operation, and the position of the pitman 150 depends on the add or subtract mechanism, all as will be hereinafter described.

The mechanism for controlling the shaft 147 and therefore the engagement and disengagement of the algebraic accumulator wheels, is best shown in Figs. 9 to 14 inclusive and in Fig. 20, most of this mechanism being mounted on the outside of the right-hand frame bracket 86 (the observer is assumed to be in front of the machine). This shaft 147 has fixed thereto an arm 157 to which is pivoted a pitman 158 which is drawn upward by a spring 160. This pitman carries a stud 161 which during accumulating operations is pressed down as shown in Fig. 9 by an arm 162 fast on the end of the shaft 83 which shaft is rocked counter-clockwise in Fig. 9 whenever the machine is set for taking a group total. The shaft 83 has at its other end an arm 163 (Fig. 25) connected by a link 164 with an arm 165 on the total shaft 70, this being ordinary Powers construction. The construction is such that during accumulating operations the pitman 158 is held in its lower position shown in Fig. 9 and that during total taking operations it is held in its upper position, shown in Figs. 11 and 12, having been moved to the latter position due to rocking of total shaft 70 (counter-clockwise as viewed in Fig. 25) permitting the spring 160 to move the pitman.

Mounted on the drive shaft 123 is a cam disk 166 comprising two dwells, a long low dwell and a shorter high dwell connected by cam surfaces which control two follower rollers 167 and 167' standing respectively beneath and above the shaft 123 and about 180° apart with respect to the rotation of said shaft. In the position which we have called the normal or initial position of the machine, the cam 166 stands about as shown in Figs. 9, 11 and 20 so that very soon after the shaft begins to rotate or very early in a cycle of operation, the lower follower roller 167 will be moved downward and at about a half rotation later upper roller 167' will be moved upward, the lower roller meanwhile having been restored to normal. The roller 167 is mounted on a bell crank 170 pivoted to the bracket 86 at 171 and having an upstanding arm 172, the upper edge of which comprises a flat part 173 from which a finger 174 projects upward. The roller 167' is mounted on a similar bell crank which has been lettered 170' on the drawings, the arm 172' of the upper bell crank, however, hanging downward and one bell crank bearing the relation of mirror image to the other. A stud 175 on the pitman 158 normally stands as shown in Fig. 9 where it is in the path of the lower finger 174 so that when said finger is rocked by the rotation of the shaft 123, as shown in Fig. 10, the shaft 147 will be rocked against the tension of the spring 155. The pitman 150 will move to its forward position shown in Figs. 5 and 6 and the springs 144 and arms 142 will bring the accumulator wheels to their neutral position which they will occupy during that part of the rotation of the shaft in which the sectors 35 and the rack bars 93 and 94 are moving forward to be arrested by whatever stops 73 may have been set. Cam 166 is arranged to allow the roller 167 to move upward and the shaft 147 to be rocked back and the spring 155 to cause the accumulator wheels to engage with one or the other of the sets of rack bars while said rack bars are in their forward or advanced positions, and to keep them in engagement during the return movement of the racks.

Figure 3:
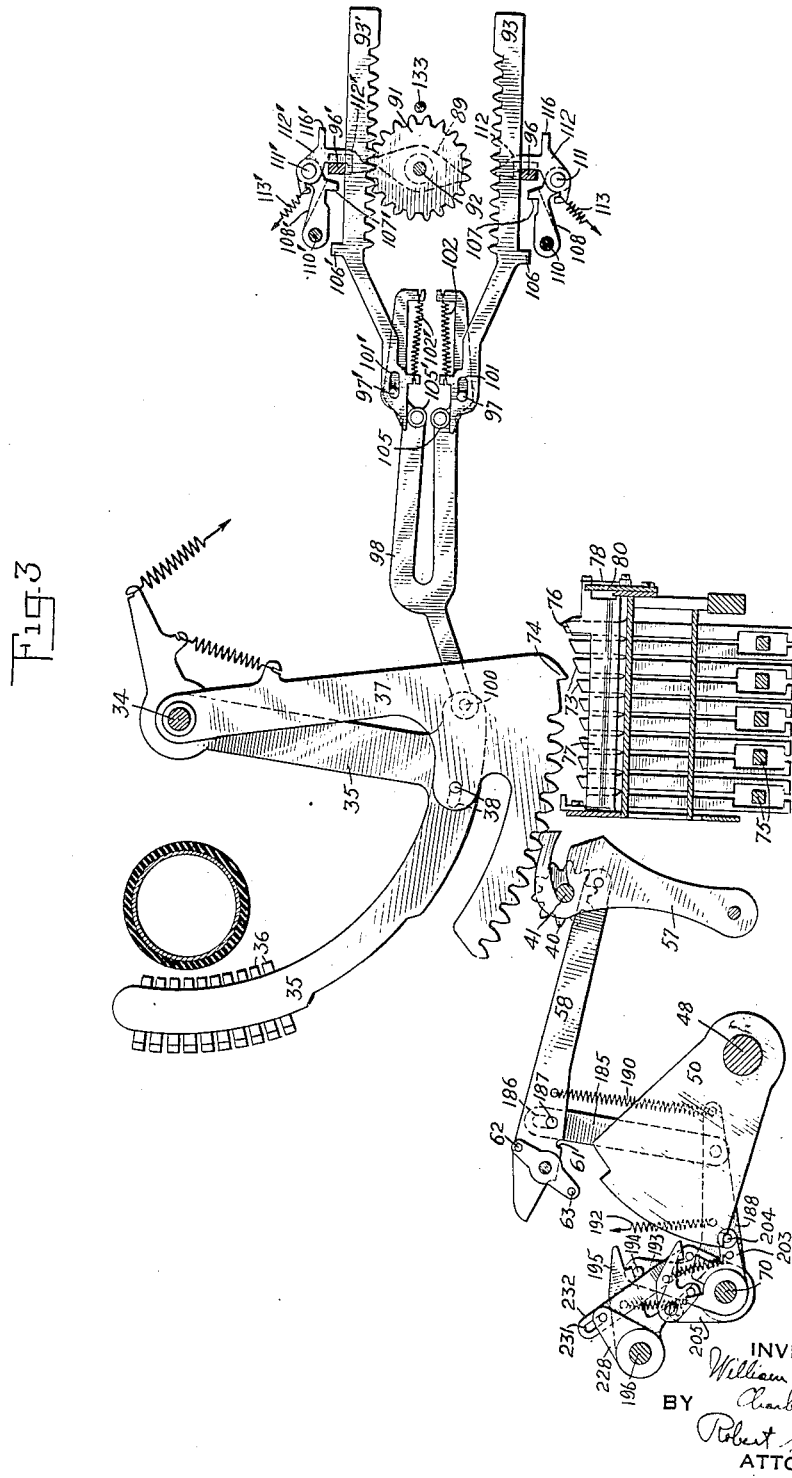
Fig. 3 is a view similar to a portion of Fig. 2, but showing the mechanism as it stands at about the end of the first half of a cycle in which a negative total is being transferred from the algebraic accumulator to the associated forward accumulator.
Figure 4:
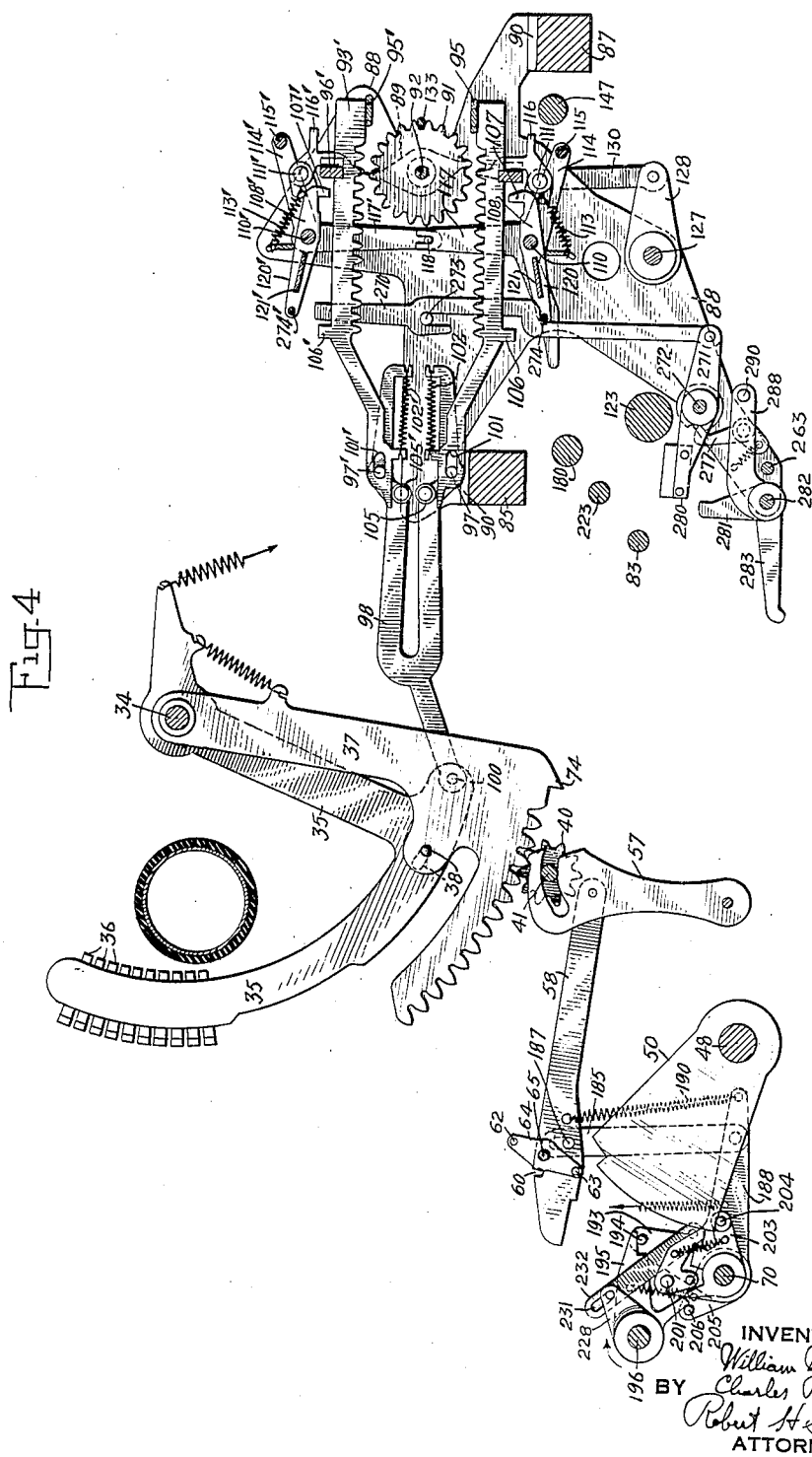
Fig. 4 is a view of the same general character as Fig. 3 showing the parts at about the same stage in a cycle, the cycle however being that of printing a grand total.

In case the operation is a total taking operation, the shaft 83 will have been rocked and pitman 158 will have moved to its upper position as in Fig. 11. In this operation, the algebraic accumulators, will remain in mesh with the racks 93 or 93' during approximately the first half rotation of the shaft 123 so as to set the racks according to the amount indicated on the wheels as shown in Fig. 3. At the end of the first half rotation of the shaft 123, follower roller 167' will be forced upward as shown in Fig. 12, the shaft 147 will be rocked against the tension of springs 155, and the accumulator wheels will be moved by springs 144 out of engagement so as to leave them clear during the return motion of the racks.

*Timing of front accumulator having no associated algebraic accumulator*

The timing of the regular Powers accumulators is given in detail in the patents cited in the beginning of the specification. That timing is utilized herein without change for all computing units which do not have associated algebraic units.

The accumulator wheels 40 are mounted on a shaft which is raised or lowered by a camming hook or rocker cam arm 57 (Figs. 1, 2, 3, 4, and 19). Pivotally attached to this hook is a pitman 58 having two notches 60 and 61, the first on its upper edge and the second on its lower edge.

When an adding operation is performed, the notch 60 engages upper pin 62 of the rocker arm 64 which is rigid with a shaft 65 on which is loosely mounted a downwardly extending spring-centralized roller carrying arm 66 (see Fig. 19) having a limited free movement determined by a pin plate rigid with said shaft 65. Fan cam 50 oscillates with every operation of the machine. In the initial part of the first half cycle, the forward notch thereof rocks the arm 66 thereby oscillating the shaft 65 and rocker arm 64; thus shifting the pitman 58 rearwardly to cam the accumulator wheels 40 out of mesh with actuating racks 37. The shaft 65 will be rocked in the opposite sense during the initial part of the return movement of sector 50, to engage the accumulator wheels 40 by shifting pitman 58 in the corresponding opposite direction with the actuators 37 in positions which they have assumed under control of the record cards.

When a total taking operation is performed, the described engagements between pitman 58 and rocker arm 64 are inverted, but since the accumulator wheels 40 are normally in mesh with actuators 37 they should remain in mesh during the first half cycle of operation. This is effected by withdrawing notch 60 from engagement with pin 62. Notch 61 is so located that it does not lie immediately above the pin 63 of the rocker arm when said rocker arm is in normal position but is in a position to engage said pin when the rocker arm has been shifted during the movement of sector 50. This requires a flexible connection in the train of mechanism for pulling pitman 58 down. In the normal operation of the Powers mechanism, the machine is set for taking totals by drawing the link 72 (Fig. 26) downwardly thus rocking arm 71 which is fast to shaft 70 to which is also fast an arm similar to the arm 188 shown (except for those computing units to which an algebraic unit has been attached as will be fully described under the next heading). Near the rearward end of said arm is a link 185 having a pin and slot connection 187 with the pitman 58. The aforesaid flexible connection is the spring 190 extending between the rearward end of arm 188 and the pitman 58. Therefore, when shaft 65 has been oscillated after shaft 70 has been rocked, the spring 190 is tensioned until the shaft 65 is rocked sufficiently to bring pin 63 beneath the notch 61; then spring 190 effects a positive engagement of the pitman 58 with the lower pin 63. When the sector 50 starts its return movement at the initial part of the second half-cycle of operation, shaft 65 is oscillated to shift the pitman 58 rearwardly and thus disengage the accumulator wheels 40 which have been turned to their zero positions during the forward stroke of the actuators 37 during the first half-cycle of the machine operation.

It is thus seen that during adding operations, the accumulator wheels 40 are disengaged during the first half-cycle of operation or forward excursion of the actuators and engaged during the second half-cycle or return movement of the actuators and during total taking the order of engagement of the wheels with the actuators is exactly the inverse of that for adding operations.

Timing of front accumulators having associated algebraic accumulators

In the form of the invention illustrated, data taken from card fields by the sensing mechanism of a tabulator, having front and rear, or algebraic accumulators associated therewith, is accumulated in the algebraic accumulators, the front accumulators standing at non-add position during such accumulating operation. When group totals are taken, both the front and algebraic accumulators are engaged with their racks, although not simultaneously, and the amounts previously accumulated on the rear or algebraic accumulators are transferred to the associated front accumulators. When grand totals are taken, the algebraic accumulators are disengaged from their racks and the front accumulators engaged with their racks, thus causing the amounts accumulated in the latter to be printed.

It is readily seen from the above that the timing of those front accumulators which have algebraic accumulators associated therewith, is different from that of the front accumulators which operate alone. The timing mechanism is somewhat modified to accomplish this modified timing.

The modified mechanism includes a latch 195 (see Figs. 1, 2, 3, 4 and 19) loosely mounted on shaft 196 and adapted to hold arm 188 in a midposition so that neither pin 62 nor pin 63 will operate the pitman 58 (this position of the arm and pitman is clearly shown in Fig. 1). Arm 188 is fast to a sleeve 191, which is loosely mounted on shaft 70, instead of being fixed to the shaft as in the usual Powers construction described briefly under the preceding heading. Also fixed to the sleeve 191 is a gusset plate 198 having pivoted thereto a link 232 having a pin and slot connection 230 and 231 with the arm 228 fast on shaft 196. Mounted loosely on shaft 70 and adjacent to gusset plate 198 is a bell crank 203, which carries a pin 204 adapted to cooperate with the sector 50. The vertical arm of bell crank 203 is adapted to cooperate with a latch 200 mounted on gusset plate 198. Latch 200 is normally held in engagement with the vertical arm of bell crank 203 by spring 202, but may be disengaged by the action of arm 199, which is fast to a collar on shaft 70 and which is adapted to operate latch 200 by cooperating with a pin on the latter.

With the above described mechanism in mind, let it be assumed that the machine is to go through an accumulating cycle. The mechanism is initially positioned as shown in Figure 1 and, since the pitman 58 is in its midposition, the oscillation of sector 50 is ineffective to move it. As a result, arm 57 remains in the position shown and the accumulator wheels 40 do not engage the racks 37.

When a group total is to be taken, shaft 70 is rocked (under control of a group total card, as 254 in Fig. 22) and arm 199 fast thereto releases latch 200, while arm 205 likewise fast to shaft 70 strikes finger 207 on arm 195, thus raising 195 and releasing pin 194. Arm 188 is then rotated counterclockwise under tension of spring 192 and pitman 58 is elevated by link 185, so that it will be engaged by rocker arm pin 62 on the return movement of the sector 50. It is to be noted that, although sector 50, at or near its extreme forward position, strikes pin 204 and rotates bell crank 203 clockwise, this is without effect, since latch 200 has been released as described above. Due to the engagement of pin 62 with pitman 58 on the return stroke of the sector 50, the wheels 40 will be engaged with their actuators during the return movement of the latter, and the amounts accumulated on the algebraic units will be transferred to the front accumulator. The positions of the parts after this operation will be those shown in Fig. 19. It will be noted that these positions are identical with those of a simple Powers accumulator after an adding operation, as described under the preceding heading.

Group total taking is in some instances followed by additional accumulating operations and in other instances by grand total taking operations.

When an accumulating cycle follows a total taking operation, neither shaft 70 nor shaft 196 is rocked. Then upon the forward movement of sector 50 (the parts being initially in the position of Fig. 19) the accumulator wheels 40 become disengaged from the actuators 37. Shortly thereafter the sector reaches its forward position and strikes pin 204, which then causes rotation of bell crank 203. Latch 200 being engaged at this time the bell crank carries the latch with it and causes rotation of plate 198 and sleeve 191. These rotations, however, are limited in extent and serve merely to position pin 194 in front of the notch in arm 195 where it is locked due to tension of spring 197. Then upon return of sector 50 shaft 65 is rocked but ineffectively, since the pitman 58 now lies in its midposition. At the completion of an accumulating cycle the parts again are in the position of Fig. 1.

When a total taking cycle is to be followed by a grand total taking cycle, the operation is initiated by rocking shaft 196 (Fig. 19) against the tension of its spring 189 (this rocking of shaft 196 is under control of a grand total card as will hereinafter appear). When shaft 196 is rocked the arm 228 moves the link 232 to rock the gusset plate 198 clockwise, thus lowering the arm 188 and consequently lowering the pitman 58 and disengaging it from upper rocker pin 62 and positioning it so that it will engage with the lower rocker pin 63 just after the sector 50 starts to return to normal position. It is to be noted that, although sector 50 strikes pin 204 and rotates bell crank 203 at about the middle of the grand total taking cycle, this is ineffective since sleeve 191 has already been rotated clockwise to its limit of motion by movement of arm 232. As soon as arm 227 is released, spring 189 restores shaft 196 to normal position and permits spring 192 to move arm 188 upwards. Since latch 195 is loose on shaft 196, it will have dropped to its lower position and will block pin 194, thus holding the parts in the position of Fig. 1.

If another accumulating cycle be now initiated, it will be identical to that described in the fourth paragraph under this heading.

Accumulator timing in general

In calculating machines generally the different computations which can be performed by the machine are distinguishable by the relative times, with respect to the movements of the wheel actuators, during which the various accumulator wheels are operated. Some of these different operations have received names which are well recognized in the art such as "total-taking", "adding", "subtracting" etc. A diagrammatic table of some of the possible operations is shown in Fig. 24.

In a machine of the general character of the algebraic unit herein disclosed the operations include:

(a) A first half cycle including a forward movement of the actuators and a second half cycle including return movement of the actuators;

(b) The accumulator wheels may be active or inactive during either half cycle;

(c) The wheels when active may be driven either by the upper wheel actuators or by the lower wheel actuators; and (d) The accumulator wheels themselves may or may not determine which of the two sets of actuators will under certain conditions operate said wheels.

According to the law of combinations, this would make possible sixteen different operations, if all of the pairs of alternatives were combinable with each other; but (c) does not combine with (b) in the case where the wheels are inactive in both cycles so that the number of operations of the algebraic accumulator theoretically possible is twelve. In the specific instance illustrated in the drawings some of these are not provided for.

In the case of an algebraic accumulator the actuators 93 and 93' have forward and return movements. The half-cycle of operation during which the accumulator wheels are active or inactive is determined by the alternative positions of the pitman 158 which, as described above, disables the spring 155.

The position of the pitman 150 with respect to pins 153 and 154 determines which of the pair of actuating racks will operate the wheels; and finally, as has been described hereinabove, the credit balance mechanism shown in Fig. 18 determines, under certain conditions, depending upon the character of the total in the wheels, which of the two sets of racks will operate said wheels.

Thus there are present four trains of mechanism each having alternative positions as specified under (a), (b), (c) and (d) above; and the mechanism has therefore a possible total of twelve combinations for governing the accumulator. The accumulator timing mechanism illustrated in the drawings is one such that after an adding operation, the accumulator is in position for a positive total and after a subtracting operation it is in position for a negative total. This property of the timing mechanism is diagrammatically illustrated by the dotted lines in Fig. 24. Indeed, Fig. 24 is a diagrammatic double entry table of several useful accumulator operations. For example, the relative positions of the racks and accumulator wheels during a subtracting operation at the end of the first half-cycle is illustrated at the intersection of the third row and second column; again the relative position of the parts during the first half-cycle when the operation is positive total taking is illustrated at the intersection of the second row and third column. Similarly for all the other combinations.

Accumulators of the general form of the front accumulator are capable of performing operations which include but half the operations possible for the algebraic type. Thus accumulators of this type may or may not be in mesh with their actuators during the forward or return movements of the latter.

In the case of the front accumulator having no associated algebraic accumulator, but two of the four possible combinations are utilized. Therefore, these accumulators are capable of adding and taking totals only.

In the case of those front accumulators having associated algebraic units, three of the four possible combinations are provided for and these accumulators may be conditioned for adding, total-taking or non-adding.

Each of these different computations is determined by the position of pitman 58. (See Figs. 1 and 19.) The regular adding operation requires engagement of pin 62 by the pitman; and total taking requires engagement of pin 63 by the pitman 58 as in the usual Powers construction. For those computing units which have been modified by the attachment of an algebraic unit the pitman 58 has the additional stable position which is intermediate between those just specifically mentioned and which is shown in Fig. 1, so that under certain circumstances, such as described in detail hereinabove, the corresponding accumulators are not operated during either half-cycle of operation, that is, the operation is that of non-adding.

*Normal state of the mechanism*

For the regular Powers accumulators the pitman 58 normally engages pin 62, therefore, the normal timing is that of an adding operation.

The normal state of the front computing units to which an algebraic unit is attached is that of non-add, the normal position of pitman 58 being the mid-position shown in Fig. 1.

The normal operation of the attached algebraic unit accumulator is that of adding, but at the end of an operation the wheels 91 may be in mesh with either the upper racks 93' or the lower racks 93.

The actuators 37 for the regular Powers computing units and the connected actuators 93—93' for the modified computing units are under control of the stops 76 on the shutters 77. The zero stops 76 have dual disabling means, the one is individual comprising the regular hump on the side of any pin 73 of any row; and the second is group collective, including the cam operable slides 80 (Fig. 20), controllable by various total cards.

The special character printing type sector 290' (Figs. 22 and 23) is normally inactive and is further controlled by its individual row of pin basket stops; and its zero stop is released as an incident in the movement of the slide 80 of the adjacent set of rows of stops 73.

The tens transfer mechanism (Figs. 2, 3, 4, 18) is usually prepared for an adding or a subtracting operation only, so that a spacing operation is necessary before taking a total.

*Modifying the normal state*

All operations differing from normal, in the specific instance illustrated, are initiated by sensing pins passing through special perforations in cards. The sensing pins for the special perforations are the usual sensing pins; the connecting box wires are substantially the usual ones including the usual Y-wires. Examples of special cards with their perforations and cooperating connecting box wires are shown diagrammatically in Fig. 22.

At times the special character printing sector 290' is not released for operation when it is not desired to print a special character, such as, for example, when the machine is to be prepared for a total taking cycle during a spacing stroke. When a card such as 253 or 255 is in the sensing mechanism, during an operation of the machine, one of the usual sensing pins will pass through perforation 293 to elevate wire 294 to elevate the stop 295 to prevent motion of the special sector 290'.

When an item is to be subtracted it is desirable to print a special sign, such as "—", and condition the timing mechanism of the rear accumulator wheels for subtraction. Such printing and conditioning is under control of a usual sensing pin which may pass through the special perforation 252 and act on the Y-wire 258—260. The branch 258 determines the extent of operation of the sector 290' through stop 291 and branch 260 exercises a supervisory control through arm 262, shaft 263 and arm 264 (see also Fig. 18) for positioning the pitman 150 against the tension of spring 265, so that the rear accumulator will operate subtractively.

When a group total is to be taken, the usual Powers total card 254, having the usual perforation 267, is provided with one or more special perforations 287. Perforation 267 is sensed in the usual manner to effect a total taking operation and a usual sensing pin acting through perforation 287 controls the movement of Y-wire 286—285. Branch 286 merely controls the extent of movement of the special sector 290' through stop 292 to print a special sign, such as "CR" (indicating a group total of negative sign which may be a credit or debit balance depending upon whether the viewpoint is that of vendor or vendee) and branch 285 acts on lever 283 to rock shaft 282 to position pitman 150 for a subtracting operation (see also Fig. 18) unless interponent 280, which is connected to the credit balance mechanism, blocks such movement. It will be remembered that interponent 280 is positioned by the operation of the highest order transfer mechanism of the algebraic mechanism, and, hence, its position is a measure or indication of the sign of the total.

Sometimes, as during grand total taking or special total transferring operations, it is desirable to print special characters. An example of such is special perforation 297 in the grand total card 256. A sensing pin passing through this hole elevates a wire 298 and stop 300 to control the positioning of sector 290 to print a special sign such as "GT." Extra stops 299 are provided to control the printing of other special characters if so desired.

Special perforation 257 in the grand total card 256 permits a usual sensing pin to elevate wire 213 for connecting latch 220 (Figs. 15, 16, 17 and 21) with the cam oscillated arm 211 for rocking the shaft 223. When shaft 223 is rocked, the following changes in the normal state are effected; (1) all zero stops of the modified computing units are released; (2) the timing mechanism of the rear accumulators 91 is conditioned for a non-add operation by initiating a spring tension on latch 244; and (3) shaft 196 is rocked to condition the corresponding front accumulator wheels 40 for total taking.

All special perforations except 257 and 267 may occur on either otherwise blank cards or upon cards having the usual value perforations. If they occur on otherwise blank cards, they may logically be designated "special space cards".

Adding on the algebraic unit

This is the normal operation. Assume first that the wheels 91 are in mesh with the adding racks 93 when a card in the sensing mechanism has no perforation to determine other than an adding operation. All trains of mechanism operate as in the usual Powers construction. The stops 73 (Fig. 1) are set to control the extent of movement of the actuators 37, and the connected actuators 93 and 93'. The pitmans 58 of the computing units, having no associated algebraic units, are and remain in add position. The remaining pitmans 58 are and remain in non-add position. Pitmans 158 and 150 (Fig. 20) are and remain in their normal lowered and elevated positions respectively. During an operation of the machine, the accumulator wheel actuators travel extents determined by the item perforations in an addition card 250, it being noted that there are no special perforations in this card, for it merely controls an operation corresponding to normal. The operation is that of adding items in the regular computing units and in the accumulators 91 as hereinbefore described.

If in the preceding operation the rear accumulator wheels 91 had been in mesh with the subtracting racks, the operation would be modified as follows. As soon as cam 166 on shaft 123 during the initial portion of the first half-cycle of operation, operates the lower bell crank 170 to draw pitman 158 forwardly thus rocking shaft 147 and tensioning spring 155 then springs 144 (Figs. 5 to 8) centralize the wheels 91 and spring 265 is free to shift pitman 150 into the adding position assumed at the beginning of the preceding paragraph. The remainder of the operation is then identical with the preceding.

Subtracting on the algebraic unit

This operation is only a slight modification of that described in the two preceding paragraphs and is brought about by a control card such as 251 containing value perforations and a special perforation 252 for controlling the Y-wires 258—260. All operations of the machine will be identical with the preceding except insofar as they are modified by the said Y-wire. These modifications are: positioning of stop 291 to position the special type on the sector 290' in conjunction with the subtracted item; and the rocking by branch 260 of the Y-wire of arm 262 fast on the shaft 263, arm 264 and pitman 150. As soon as cam 166 (Fig. 20) has rotated sufficiently during the initial part of the first half-cycle of the operation to fully rock bell crank 170 and draw pitman 158 forwardly so that rock shaft 147 has prevented spring 155 from moving pitman 150 rearward, then springs 144 (Figs. 5 to 8) centralize the accumulator wheels 91, and then pitman 150 is free to be shifted. If the pitman 150 had been in engagement with pin 153 it would now be shifted to engage pin 154 by the spring of the sensing mechanism associated with the Y-wire 258—260 by elevating said Y-wire. If pitman 150 had been in engagement with pin 154 the Y-wire 258—260 would have been elevated as soon as the subtracting card was sensed, and then no further movement would occur at this time. The remainder of the operation is identical with that of the next preceding paragraph except that the accumulator wheels 91, due to the reversal of the pitman 150, are meshed and retained in mesh with the subtracting racks 93' during the initial part of the second half-cycle of operation and the sector 290' has been positioned for printing a special sign.

Spacing

A spacing cycle is one where none of the numerical value pin basket stops is positioned during an operation. Such a card as 253 (Fig. 22) may contain a pair of perforations such as 287 and 293 for each of a plurality of computing units. The latter 293 prevents the release of the zero shutter 77 by replacing the latter by the stop 295. Otherwise the shutter 77 might be released because of the presence of the perforation 287. The sector 290' is blocked for it is not ordinarily desirable to print a special character during a spacing operation. Perforation 287 permits the sensing mechanism spring to elevate (or attempt to elevate) Y-wire 286—285. The said Y-wire will be elevated if arm 283 fixed to shaft 282 is not blocked against operation by the credit balance mechanism, otherwise said arm will remain at normal position, or what is the same thing shaft 282 will be rocked if the total in the accumulator is negative. In other words, shaft 282 will be rocked if the credit balance switch bar 270 (Fig. 18) is in its lowered position as shown in said figure. Otherwise the interponent 280 will block arm 281 fixed to shaft 282. If pitman 150 is in engagement with pin 154 such rocking will be an idle movement, otherwise the said pitman will be lowered to engage said pin 154 by engagement of pin 290 on arm 288 with arm 264 which is connected to said pitman 150 by link 266.

If the arm 281 is blocked by interponent 280, the remainder of the operation will be identical with that described above under the heading "Adding on the algebraic unit". If it is not blocked, the remainder of the operation will be identical with that described under the heading "Subtracting on the algebraic unit" except as to the absence of a printed special sign. In either case, no significant amount will be accumulated in the accumulators hence, at the end of the complete cycle, all tens transfers will be in normal position so that the machine will be in condition for either a total taking or an accumulating operation.

*Total taking*

If the machine has been conditioned for total taking by a spacing operation, it is then ready to receive a group total card such as 254 with the regular total controlling perforation 267. For those computing units which have not been modified, the total taking operation is substantially that described in the patents Lasker No. 1,376,555 and Powers No. 1,245,506 which briefly is as follows. Walking beam 4 (Fig. 26) is positioned so that, as the shaft 1 and cam 2 revolve, its stud 5 will align with and lie on the left side of the stud on bell crank 6 so that when the cam returns to its normal position (shown in the figure) link 72 is drawn downwardly to rock shaft 70. Such rocking of shaft 70 rocks those arms 188 (Fig. 19) which are fast to said shaft clockwise so as to invert the engaging relation of pitman 58 with rocker arm 64 so that those accumulator wheels 40 associated with the accumulating mechanism shown in the above cited patents will be positioned for a total taking operation. Said shaft 70 has an arm 165 (Fig. 25) rigid therewith which is connected by a link 164 with an arm 163 rigid with shaft 83. Fixed to shaft 83 is a series of camming blocks 82 (Figs. 15, 16, 17 and 20) which, in the case of the unmodified computing units, release the zero stops by shifting the slides 80; while in the case of the modified computing units, although the zero stops are also released by the corresponding blocks 82, the blocks are rocked by pins 235 acting on blades 236 of the loosely mounted blocks 82, fixed to arms 234 rigid with said shaft 83. Rocking of said shaft 83 elevates finger 162 (see Figs. 11 and 12) so that pitman 158 is operated by the upper bell-crank 170' during the initial part of the second half-cycle of operation. Hence, the accumulator wheels 91 have their timing relation inverted so that they will pass through a total taking cycle irrespective of the position of pitman 150.

Rocking of shaft 70 correspondingly rocks arm 199 (Fig. 19) to disengage latch 200 from the bell crank 203 and also elevates latch 195, by the cooperation of pin 206 on arm 205 with finger 207 of said latch, so that spring 192 is free to elevate pitman 58 for a usual adding timing operation. Hence, to sum up, perforation 267 controls the following performances in the hereinbefore described trains of mechanism: (1) releases all zero stops including those associated with special character sectors 290'; (2) inverts the timing relation of the accumulator wheels 40 associated with the unmodified computing units; (3) disables the normal non-add condition of the accumulator wheels 40 in the modified units so that they will execute an adding operation; and (4) inverts the normal adding condition of the accumulator wheels of the attached algebraic units. Therefore, such an operation of the machine is that of total taking from the accumulators in the unmodified units; total taking from the accumulators of the attached algebraic units, in such manner as determined by the supervisory control of their credit balance mechanism, and shifting of the timing mechanism of the front accumulators of the modified units for an adding operation.

*Grand total taking*

When the machine has been conditioned for total taking by a spacing operation, it is then ready to receive a grand total card such as 256 in Fig. 22. As shown, this card is provided with special perforations 297 for governing the extent of movement of the special character printing sectors 290' and the hole 257 for permitting the sensing mechanism to elevate a wire 213 to rock lever 215 (see also Fig. 21) to engage the latch 220 with cam operated arm 211 thus causing the rotation of shaft 123 to rock shaft 223. Rocking of shaft 223 alters certain of the normal conditions thus:

(1) zero latch shutters 76 associated with the modified computing units are released by rocking-pin carrying arms 230 fast to shaft 223 as shown in Fig. 20;

(2) latch 244 is placed under spring tension by forward movement of arm 241, link 242, and tensioning of spring 246 to hold shaft 147 in rocked position (to which position it is rocked by pitman 158 at the start of the cycle) during the initial part of the first half-cycle of operation; and (3) shaft 196 (Fig. 19) is rocked against the tension of its spring 189 to position the pitman 58 of the modified computing units for total taking.

The remaining zero stop releasing slides 80 are not moved, hence only the modified computing units are involved in this operation which is in final effect an ordinary total taking operation for the front accumulators 40 of the modified units and a spacing operation for the unmodified computing units.

*Operation*

One method of operation of the above described machine may now be briefly summarized. The record cards, upon some of which are positive values and upon others of which are negative values, are all placed in the magazine 14 and fed consecutively from the bottom of the pile to the sensing mechanism 11. Information of a class which does not vary between positive and negative values is set up by the sensing mechanism 11 coacting with the appropriate wires 30, and is accumulated and printed in a manner heretofore well known.

The class of information which may be positive or may be negative according to the indicia on the card is set up in the same manner as indicated in the preceding paragraph. However, the accumulation is varied from that above in that amounts are rolled into the rear accumulator wheels 91 when the sectors 35 return from printing position. Appropriate control holes 252 (Fig. 22) govern the meshing of accumulator wheels 91 with the subtracting rack 93', otherwise the wheels mesh with adding rack 93. Suitable mechanism has been provided and hereinbefore described to hold the associated front accumulators, which are used for grand totals, out of mesh during item entry cycles.

If a group total is indicated, by perforation 267, in total card 254, accumulator wheels 91 will mesh with the appropriate rack 93 or 93'. The perforation 267 in card 254 tends to set the accumulator wheels 91 in mesh with racks 93' unless interponent 280 (Fig. 18) prevents such setting, i. e., when interponent 280 is effective, the wheels are meshed with racks 93, whereas when interponent 280 is ineffective, the wheels are meshed with racks 93'. Suitable mechanism controls the position of the accumulator wheels with respect to these racks so that, if the total is positive, rack 93 is engaged, and, if it is negative, rack 93' is engaged. Each total card is preceded by a space card 253 in which card are perforations 287 and 293. Through the medium of these control perforations in card 253, certain instrumentalities of the machine are set in anticipation of the taking of a total.

When a grand total is desired a space card 255 is placed after the total card of the last group and for the same purpose. This is followed by a grand total card 256 which has two control perforations 257 and 297. Perforation 257 influences the mechanism shown in Fig. 21 to pull the grand total shaft 196 (Fig. 19) and actuate its associated mechanism to effect a grand total. Perforation 297 influences the printing of a grand total character on the line with the printed grand total.

Transferring totals

Under the heading "Total taking" it was shown that, when the accumulator wheels 91 were conditioned for a total taking operation, the corresponding front accumulator wheels were conditioned for an adding operation. Hence, during the cycle in which the totals from the rear accumulator wheels 91 were recorded, the totals were accumulated, irrespective of algebraic sign, in the wheels 40. Such an operation is well known in the art as that of transferring totals.

For certain types of statistical records, it is desirable to print totals which are in the nature of checking totals. Thus, if a series of both positive and negative totals are added together, irrespective of their algebraic sign, to produce a so-called checking total, then a check upon the operations of total taking may be effected. If it should be desired to obtain a net or balance total, the sum of all the specially designated negative totals is obtained, the sum doubled, and the difference taken between this amount and the checking total, thus giving the true net balance.

For other types of statistical records, the true net balance or grand total is of primary importance and a checking total is not required. With the above described mechanism, a true grand total of positive and negative group totals may be obtained by utilizing certain special control cards in conjunction with the control cards described hereinabove.

Subtractive transfer of totals

Let it be assumed that the machine has completed a total taking operation, and that the wheels 91 stand at negative zero and are meshed with the adding racks 93. If now a special card, containing perforations 257 and 267, is fed into the sensing mechanism, the normal conditions of the trains of mechanism will be altered as set forth under both of the headings "Total taking" and "Grand total taking". Two of these changes apparently conflict. One of the changes is the biasing of latch 244 (Fig. 20), under control of perforation 257, so that the wheels 91 would ordinarily be conditioned for a non-adding operation. However, wheels 91 have been assumed to be in mesh with the adding racks 93 and the movements of bell-crank 6, link 72, bell-crank 71, shaft 70, link 164 and arm 163, under control of perforation 267, cause rocking of shaft 83 and consequent elevation of finger 162 so that pitman 158 will not be operated until the initial part of the second half-cycle of operation. Hence, wheels 91 will remain in mesh with the adding racks as the racks are moved forwardly, and spring 246 will be tensioned until cam 166 rocks bell-crank 170' (i. e., until the initial part of the second half-cycle of operation). The second change is the rocking of shaft 70, under control of perforation 267 to release latches 200 and 195 (Fig. 19) so that spring 192 would ordinarily cause pitman 58 to engage with the upper rocker arm pin 62 to condition the front accumulator wheels 40 for an adding operation. However, since shaft 196 has been rocked, due to the presence of perforation 257, arm 228 thereon, through the medium of link 232, rocks the plate 198, thus rotating sleeve 191 and arm 188 against the tension of spring 192, and thereby positions pitman 58 for a total taking operation. Hence, the two apparent conflicts merely result in tensioning springs 246 and 192. Consideration of the above and of the timing operation described under the headings "Total taking" and "Grand total taking" makes it obvious that wheels 91, under the condition assumed, are engaged with their adding racks during forward movement thereof and are disengaged during return movement. Likewise, such consideration shows that the wheels 40 are also engaged with their racks during forward movement thereof and disengaged during return. Since the forward wheels are assumed to have a total thereon at the beginning of this operation, it is obvious that the movements of the racks are controlled by the forward wheels and, consequently, the amount thereon is subtracted from the series of nines standing on the rear accumulator wheels. Thus, at the end of this operation, the amount remaining on the rear wheels is the nines complement of the amount previously standing on the front wheels.

Manifestly, the same operation may be performed when the wheels 91 stand at positive zero and are in mesh with the subtracting racks 93'.

From the foregoing description, it is evident that since both accumulators may be timed for a total taking operation simultaneously, it is immaterial which of the two contains the series of nines. Thus, if the front accumulator 40 stood with all its wheels at "9" and the rear accumulator 91 had some total therein, a subtractive transfer may be effected from the rear accumulator to the front accumulator. Obviously, this type of subtractive transfer may be effected in the same manner whether wheels 91 are engaged with racks 93 or with racks 93' at the time.

All four of these possible subtractive transfers of totals are readily controlled by cards as will be apparent to those skilled in the art. For example, let it be assumed that a net grand total is desired in the tabulation of a run of cards which comprises a plurality of positive and negative items, and that the positive items are divisible into associated groups, the total of each of which is to be printed. It will be assumed that each item of data from which the compilation is to be made is recorded on a separate card. The item cards should first be sorted to separate those indicating negative amounts from those indicating positive amounts, and the cards containing positive amounts thereafter sorted according to groups. Utilizing a machine which had been cleared and assuming that the rear wheels stand at positive zero and that link 270 of the credit balance mechanism is in its upper position, a possible arrangement of cards to procure a net grand total follows:

(1) A space card 253 having in addition, a subtraction perforation 252.

(2) A group total card 254 having, in addition, a subtraction perforation 252, and, if desired, a perforation for a special stop 299;

(3) The series of cards containing negative amounts, each having a subtraction perforation 252;

(4) A card identical with (1) above;

(5) A group total card 254 provided, in addition, with perforations 252 and 257;

(6) The first group of cards containing positive amounts;

(7) A space card 253;

(8) A total card 254;

(9) A repetition of the grouping (6), (7) and (8) for each of the positive groups;

(10) A card identical with (1) above;

(11) A group total card 254 having, in addition, perforations 252, 257, and any desired perforation for controlling a suitable stop 299;

(12) A card identical with (1) above;

(13) A group total card 254 having, in addition, a perforation 252 and any desired perforation for a suitable stop 299 for indicating the net grand total.

The operations that are controlled by these cards are merely repetitions or combinations of those previously described and are clearly illustrated in Table A, in which the first column indicates the cyle of operation; the second column indicates the card shown in Fig. 22 that may be used for controlling a given operation; the third, the additional control perforations required in certain of these cards; the fourth, the amount printed on the report sheet during each cycle; the fifth, the amount accumulated in or subtracted from the front accumulator 40 during certain cycles; the sixth, the amount standing on the front accumulator at the end of each cycle; the seventh, the amount accumulated in or subtracted from the rear accumulator 91 during a given cycle; the eighth, the significant amount standing on the rear accumulator at the end of each cycle; the. ninth indicates the actuating racks with which the rear wheels were engaged during the operation, "A" representing the adding racks 93 and "S" representing the subtracting racks 93'.

To facilitate the understanding of the manner of operation of the mechanism of the present invention, the following Table A illustrates a simple example rather than a practical application. In this case, a single positive group, comprising two items, is subtracted from a negative group comprising two items.

Table A

| Cycle | Card | Addit. perf. | Print | Rolled-in front | Total on front | Rolled-in rear | Total on rear | In mesh with |
|---|---|---|---|---|---|---|---|---|
| | | | | | 0000 | | 0000 | A |
| 1 | 253 | 252 | | | 0000 | | 9999 | S |
| 2 | 254 | 252 | (−9999) | 9999 | 9999 | Cleared | 0000 | S |
| | | | | | | | (9999) | (A) |
| 3 | 251 | | −7 | | 9999 | (−)7 | 0007 | S |
| 4 | 251 | | −7 | | 9999 | (−)7 | 0014 | S |
| 5 | 253 | 252 | | | 9999 | | 0014 | S |
| 6 | 254 | 252 257 | −14 | *14 | 9985 | Cleared | (0000) | (S) |
| | | | | | | | 9999 | A |
| 7 | 250 | | 6 | | 9985 | (+)6 | 0006 | A |
| 8 | 250 | | 6 | | 9985 | (+)6 | 0012 | A |
| 9 | 253 | | | | 9985 | | 0012 | A |
| 10 | 254 | | T 12 | 12 | 9997 | Cleared | 9999 | S |
| | | | | | | | (0000) | (A) |
| 11 | 253 | 252 | | | 9997 | | 9999 | S |
| 12 | 254 | 252 257 | (−9997) | Cleared | 0000 | *9997 | 0002 | S |
| | | | | | | | (9997) | (A) |
| 13 | 253 | 252 | | | 0000 | | 0002 | S |
| 14 | 254 | 252 | (−2) | 2 | 0002 | Cleared | 9999 | A |
| 15 | 256 | | GT 2 | Cleared | 0000 | | 9999 | A |

The first line of Table A represents the condition of the machine at the start of the tabulation (i. e., the front wheels 40 stand at zero and the rear wheels 91 stand at positive zero). In the following explanation of operations, each step is numbered to correspond to the order of the control cards set forth in the list above.

(1) During the first cycle of operation, perforation 252 in space card 253 causes wheels 91 to be shifted upwardly to engage with subtracting racks 93'. Thus the wheels stand at "9" with reference to these racks at the end of the cycle.

(2) In the second cycle, which is in effect a total taking operation, the nines are rolled out of the rear wheels during the forward movement of the actuating racks and are transferred to the front wheels as the racks return. Thus, at the end of this cycle the rear wheels stand at negative zero.

It will be apparent that this operation merely conditions the machine for subsequent operations and that the series of nines that are printed are not needed in the computation and may be blocked if desired. This condition has been indicated by enclosing this and similar amounts in brackets.

Utilizing the special type carrier 290' and the controls therefor shown in Fig. 22, a "−" sign will be printed with the total in this cycle. This is due to the fact that link 270 of the credit balance mechanism remains in its upper position, and by means of interponent 280 (Fig. 18) serves to prevent the elevation of wire 286 under control of the perforation 287 in the total card 254 which tends to elevate stop 292 to place the character "CR" in printing position. Under these circumstances, type carrier 290' would ordinarily swing all the way forward until heel 74 thereon engages stop 296 and thereby place the character "T" in printing position. However, since this card contains a substraction perforation 252 in addition to perforation 287, wire 258 is elevated and raises stop 291 to cause a "—" sign to be printed with the total.

It will be noted with reference to Fig. 24, that wheels 91 are automatically engaged with adding racks 93 at the end of each total taking operation even though the wheels may have been engaged with subtracting racks 93' during the first half cycle of operation and thus stand at negative zero at the end of the cycle. This condition is due to the particular arrangement of elements shown herein and in no way affects the proper operation of the machine, since, if the succeeding item to be accumulated is positive, the wheels remain in mesh with racks 93 and the closed cycle carrying mechanism operates automatically to insert the fugitive one and return the wheels to positive zero; whereas, if the succeeding item is negative, as in the present instance, perforation 252 which is punched in each negative item card, causes the wheels to be shifted automatically to engage with the subtracting racks 93'. In the accompanying tables, the fact that wheels 91 register different amounts with reference to racks 93 and 93' at the end of a total taking operation is shown. However, the amount which is irrelevant with reference to the succeeding operation, has been enclosed in brackets to indicate that, although this condition occurs, it is not significant.

(3) During the third and fourth cycles, the cards containing negative amounts are tabulated and the amount in each, in the present case —7, is rolled into the rear wheels. In each of these cycles, perforations 252 in each of the subtraction cards 251 causes the elevation of stop 291 to effect the printing of a "—" sign with the item.

(4) The fifth cycle is in effect a spacing operation in which the transfer mechanism of the rear accumulator is normalized. Perforation 252 causes the wheels 91 to be retained in engagement with racks 93' in preparation for the succeeding cycle.

(5) In the sixth cycle, perforations 257 and 267 control a subtractive total taking operation, as described above, in which both accumulators are engaged during the forward movement of the racks. Since the front wheels stand at nine, the rear wheels control the extent of movement of the racks, and the amount registered on the front wheels is decreased by an amount equal to that standing on the rear wheels. Thus, the total standing on the rear wheels is printed on the report sheet and subtracted from the series of nines on the front wheels. At the end of this cycle, wheels 40 contain the nines complement of the total of the negative amounts. (In the tables, the amounts subtracted from the accumulators are shown in the columns entitled "Rolled-In Front" or "Rolled-In Rear", but have been designated with an asterisk to distinguish from the other items in these columns.) Inasmuch as the position of link 270 of the credit balance mechanism has not been changed during the preceding cycles, type carrier 290' is controlled as in the second cycle and a "—" sign is printed with the total.

(6) During the next two cycles, the cards containing the positive amounts are tabulated and the amount in each, in the present case +6, is rolled into the rear wheels. It will be noted that wheels 91 stood at negative zero at the end of the sixth cycle, however, as the first positive amount is inserted the closed cycle carrying mechanism operates, as described above, to insert the fugitive one so that the wheels register the true amount with reference to racks 93. It will also be noted that, in the preceding cycles, the accumulator has not passed through zero while engaged with subtracting racks 93'. Therefore, the credit balance mechanism has not been operated and, since link 270 was assumed to be in its upper position at the beginning of the card run, the condition of the credit balance mechanism remains the same and the operation of the closed cycle carrying mechanism during the seventh cycle is ineffective thereon.

(7) The ninth cycle is a spacing operation in which the transfer mechanisms are normalized and the rear wheels conditioned for a positive total taking operation.

(8) In the tenth cycle, the rear accumulator is rotated to positive zero position during the forward movement of the actuators, and the total of the positive group is printed on the report sheet and transferred to the front accumulator during the return movement of the actuators, as described under Total taking. Thus, the true total of the positive amounts is added to the nines complement of the negative total so that the front accumulator registers the nines complement of the net balance of the positive and negative totals. In this cycle, since link 270 of the credit balance mechanism remains in its upper position, the elevation of wire 286 under control of perforations 287 is prevented by interponent 280. Therefore, type carrier 290' swings forward until heel 74 engages stop 296 and the character "T" is placed in printing position and printed with the total.

(10) In the eleventh cycle, perforation 252 causes the rear wheels to be engaged with racks 93' so that they stand at 9 with reference to these racks in preparation for the succeeding cycle.

(11) In the twelfth cycle, perforations 257 and 267 control a subtractive total taking operation, as described above, in which both accumulators are engaged during the forward movement of the racks. In this case, since the rear wheels stand at nine, the front wheels control the extent of movement of the racks and the amount registered on the rear wheels is decreased by an amount equal to that standing on the front wheels. Thus, the nines complement of the net balance is subtracted from the series of nines on the rear wheels and, therefore, the rear wheels register the true net balance with reference to racks 93'. In this cycle, perforation 252 causes the printing of a "—" sign with the total, as in cycle two. The amount printed on the report sheet during this cycle is not significant in the problem and, therefore, printing may be blocked if desired as in cycle two, above.

(12) In the thirteenth cycle, perforation 252 conditions the rear wheels for a total taking operation with reference to racks 93'.

(13) In the fourteenth cycle, wheels 91 are cleared with reference to racks 93' and the net balance of the positive and negative totals is printed on the report sheet. In this cycle, the condition of the elements controlling type carrier 290' is identical with that described in cycle two, so that a "—" sign is printed with the total.

The identifying characters shown with each total on Table A are printed in accordance with the arrangement of the character printing sector 290' (Fig. 22). Obviously, arbitrary rearrangements may be made in the position of the type and in the manner of controlling stops 299 so that characters are printed in accordance with the type of report sheet required. If it is desired to indicate the grand total with a suitable character in the present arrangement, a grand total card 256 would be placed after the last control card in the above list. Then the net balance would be printed in the fifteenth cycle and the character "GT" would be printed on the same line. In this case, printing may be blocked during the preceding cycle, as above.

The above application is particularly useful in preparing invoices in which a series of discounts and credits are to be subtracted from the amount of the bill and, in addition, the discounts and various types of credits are to be grouped separately and the totals of each group are to be printed on the invoice. However, it is possible that the amounts to be subtracted may exceed the amount of the bill as, for instance, when a customer is entitled to credits for returns on previous transactions. Under these conditions, the invoice usually requires special consideration and should be marked accordingly to attract the attention of the operator. In these cases, the present mechanism is arranged to print the tens complement of the net balance instead of the true net balance, and thereby suitably mark the invoice for special consideration.

The operation of the mechanism under the above conditions is illustrated in the following Table B. The amounts used in this case are the same as those used in the problem illustrated in Table A except that another positive group, comprising two items, is to be subtracted.

Table B

| Cycle | Card | Addit. perf. | Print | Rolled-in front | Total on front | Rolled-in rear | Total on rear | In mesh with |
|---|---|---|---|---|---|---|---|---|
| 1 | 253 | 252 | | | 0000 | | 0000 | A |
| 2 | 254 | 252 | (—9999) | 9999 | 0000 | Cleared | 9999 | S |
| | | | | | 9999 | | 0000 | S |
| 3 | 251 | | —7 | | (9999) | (—)7 | (9999) | (A) |
| 4 | 251 | | —7 | | 9999 | (—)7 | 0007 | S |
| 5 | 253 | 252 | | | 9999 | | 0014 | S |
| 6 | 254 | 252 | —14 | *14 | 9999 | Cleared | 0014 | S |
| | | 257 | | | 9985 | | (0000) | (S) |
| | | | | | | | 9999 | A |
| 7 | 250 | | 6 | | 9985 | (+)6 | 0006 | A |
| 8 | 250 | | 6 | | 9985 | (+)6 | 0012 | A |
| 9 | 253 | | | | ,9985 | | 0012 | A |
| 10 | 254 | | T 12 | 12 | 9997 | Cleared | 0000 | A |
| 11 | 250 | | 6 | | 9997 | (+)6 | 0006 | A |
| 12 | 250 | | 6 | | 9997 | (+)6 | 0012 | A |
| 13 | 253 | | | | 9997 | | 0012 | A |
| 14 | 254 | | T 12 | 12 | 0009 | Cleared | 0000 | A |
| 15 | 253 | 252 | | | 0009 | | 9999 | S |
| 16 | 254 | 252 | (—9) | Cleared | 0000 | *9 | 9990 | S |
| | | 257 | | | (0009) | | (A) | |
| 17 | 253 | 252 | | | 0000 | | 9990 | S |
| 18 | 254 | 252 | (—9990) | 9990 | 9990 | Cleared | (0000) | (S) |
| | | | | | | | 9999 | A |
| 19 | 256 | | GT 9990 | Cleared | 0000 | | 9999 | A |

It will be noted that the cards for controlling this type of operation are arranged in the manner described above. Therefore, the operations controlled during the first ten cycles of Table B correspond to those of the first ten cycles of Table A. When another amount, sufficient to change the sign of the net balance, is transferred to the front wheels, as in the fourteenth cycle, the front wheels are rotated through zero and register an amount that represents the net balance but is incorrect by one. To obtain the correct amount and to print it on the report sheet with the proper sign, the mechanism is controlled, during the succeeding five cycles, by the same cards, and operates in the same manner, as during the last five cycles of Table A, i. e., in the fifteenth cycle of Table B, the rear wheels are set at "9" with reference to subtracting racks 93', as in the eleventh cycle of Table A, and the amount registered on the front wheels is subtracted therefrom, leaving the tens complement of the true net balance on the rear wheels. This amount is then printed on the report sheet, and, since it is a complemental amount, indicates that the account requires special consideration.

Inasmuch as the cards that comprise each group are predetermined by the nature of the sign of the cards, and, further, since the control cards are arranged in the same manner in Tables A and B, it is apparent that the sign of the net balance is determined automatically by the machine and does not require special attention on the part of the operator.

Thus the mechanism of the present invention may be controlled to print the items and total of a group of amounts of one sign, and in the same column, to print the items and totals of a plurality of groups of amounts of opposite sign, and then to print the true net balance of these amounts when the total of the first group exceeds the total of the remaining groups or to print the tens complement of the net balance when the total of the first group is less than that of the remaining groups.

While we have described what we consider to be a highly desirable embodiment of our invention, it is obvious that many changes in form could be made without departing from the spirit of our invention, and we, therefore, do not limit ourselves to the exact form herein shown and described, nor to anything less than the whole of our invention as hereinbefore set forth, and as hereinafter claimed.

What we claim as new and desire to secure by Letters Patent, is:

1. In a machine of the class described; the combination of an accumulator and actuators therefor; of timing mechanism for said accumulator normally adjusted for non-adding operations record controlled means including a shaft and a spring-pressed latch operable thereby to modify the adjustment of said timing mechanism for an adding operation; and record controlled means including a second shaft for modifying the adjustment of said timing mechanism for a total taking operation.

2. In a machine of the class described, the combination of an accumulator and actuators therefor, timing mechanism for causing the engagement and disengagement of said accumulator and said actuators during accumulating and total taking operations, said last recited mechanism including a pair of cam operated bell-crank arms operable at different periods in the operation of the machine, and a pitman operable by either of said bell-cranks for causing accumulating engagement of said accumulator and actuators when operated by one of said bell-cranks and for causing total taking engagement of said accumulator and actuators when operated by the other of said bell-cranks, means normally arranged to cause the pitman to be operated by said first mentioned bell-crank, and record controlled means to cause the pitman to be operated by the other of said bell-cranks.

3. In a machine of the class described, the combination of an accumulator and actuators therefor, timing mechanism including a member movable to a plurality of positions for causing the engagement and disengagement of said accumulator and said actuators, said timing mechanism being operable by a moving part of the machine, resilient means tending to move said member to one position for causing adding operations, means operable under control of said moving part to move said member against the tension of said resilient means to a second position for causing non-adding operations, means to retain said member in said second position, record controlled means to release said retaining means whereby said resilient means are rendered effective, and additional record controlled means to move said member to a third position for causing total taking operations.

4. In a machine of the class described, the combination of record sensing mechanism, an accumulator arranged to accumulate positive and negative amounts, a set of record controlled adding racks for inserting positive amounts in the accumulator, a set of record controlled subtracting racks for inserting negative amounts in the accumulator, means operative to insert the fugitive one in said accumulator when the algebraic total of the amounts inserted in said accumulator passes through zero, the construction and arrangement being such that the accumulator is adapted to register the true algebraic total of the amounts inserted with reference to the adding racks when the total is positive and with reference to the subtracting racks when the total is negative, and means controlled by said sensing means for taking the true algebraic total from the accumulator including said adding and subtracting racks and resilient means normally arranged to cause the total to be taken with reference to the adding racks, means controlled by said sensing mechanism during a total taking operation to cause the total to be taken with reference to the subtracting racks against the tension of said resilient means, and means controlled by the accumulator to render said last recited means ineffective when the total registered by the accumulator is positive.

5. In a machine of the class described, the combination of an accumulator arranged to accumulate positive and negative amounts, a set of adding racks for inserting positive amounts in said accumulator, a set of subtracting racks for inserting negative amounts in said accumulator means for introducing the fugitive one in said accumulator when the net balance registered by said accumulator passes through zero, the construction and arrangement being such that said accumulator registers the true net balance of the amounts inserted therein with reference to the adding racks when said balance is positive and with reference to the subtracting racks when said balance is negative, and record controlled means to engage the accumulator with the set of racks with reference to which the accumulator registers a true net balance during a total taking operation, including a first resilient means normally arranged to condition said accumulator for engagement with said adding racks, a second resilient record controlled means operative during a total taking operation to condition said accumulator for engagement with said subtracting racks against the tension of said first resilient means, and means controlled by said accumulator to render said second resilient means ineffective when the amount standing on said accumulator is positive.

6. In a machine of the class described, the combination of a plurality of accumulators and connected actuators therefor, timing mechanism for causing the engagement and disengagement of one of said accumulators and its actuators, a second timing mechanism for causing the engagement and disengagement of a second of said accumulators and its actuators, each of said timing mechanisms normally tending to control the associated accumulator for adding operations, normally operative means to condition said first mentioned timing mechanism for causing non-adding operations, record controlled means to render said conditioning means ineffective whereby said first timing mechanism will cause an adding operation and to control said second timing mechanism to cause a total taking operation, and additional record controlled means to control said first timing mechanism to cause a total taking operation and to control said second timing mechanism to cause a non-adding operation.

7. In a machine of the class described the combination of an accumulator, a plurality of sets of actuating racks for said accumulator, means for reciprocating said sets of actuating racks during each cycle of machine operation, and means for causing the engagement and disengagement of said accumulator and either of said sets of racks during each cycle of machine operation including a first resilient means for engaging said accumulator with either of said sets of racks, a second resilient means for disengaging said accumulator from either of said sets of racks when said first resilient means is ineffective, means normally arranged to render said first resilient means ineffective during the movement of said racks in one direction, and record controlled means cooperating with said last mentioned means to retain said first resilient means ineffective during the movement of said racks in the other direction.

8. In a machine of the class described the combination of an accumulator, a plurality of sets of actuating racks for said accumulator, means for reciprocating said sets of actuating racks during each cycle of machine operation; means for causing the engagement and disengagement of said accumulator and either of said sets of racks during each cycle of machine operation including a first resilient means for engaging the accumulator with either of said sets of racks, a second resilient means for disengaging said accumulator from either of said sets of racks when said first resilient means is ineffective, means normally arranged to render said engaging means ineffective during the movement of said racks in one direction; and record controlled means cooperating with said last mentioned means to retain said engaging means ineffective during the movement of said racks in the other direction; and means operative during the period in which said engaging means is ineffective to condition the engaging means for selectively controlling the engagement of the accumulator with either of said sets of racks comprising resilient means normally arranged to condition said engaging means for causing the engagement of the accumulator with one of said sets of racks and record controlled means to condition said engaging means for causing the engagement of the accumulator and the other of said sets of racks against the tension of said last recited resilient means.

9. In a machine of the class described the combination of an accumulator and actuators therefor, resilient means for engaging said accumulator and said actuators, a second resilient means for disengaging said accumulator and said actuators when said engaging means is ineffective, a member arranged when operated to render said engaging means ineffective, cam controlled means for operating said member during a portion of a cycle of operation, and record controlled means to retain said member in operated position during the remainder of said cycle.

10. In a machine of the class described, the combination of an accumulator and actuators therefor, a first resilient means for engaging said accumulator and said actuators, a second resilient means for disengaging said accumulator and said actuators when said engaging means is ineffective, a pair of cam operated bell cranks operable at different periods in a machine cycle, a member operable by either of said bell-cranks and arranged when operated to render said engaging means ineffective, means normally arranged for causing one of said bell-cranks to operate said member whereby the engaging means is rendered ineffective during a certain portion of a machine cycle, and record controlled means for causing the other of said bell-cranks to operate said member whereby the engaging means is rendered ineffective during another portion of a machine cycle.

11. In a machine of the class described the combination of accumulator engaging and disengaging mechanism comprising elements operating identically in accumulating and total taking operations, an accumulator frame, operating connections between said elements and said frame, said connections comprising a link selectively movable to a plurality of positions and operable by one of said elements while in certain of said positions for causing accumulating or total taking engagement of said accumulator, resilient means tending to move said link to one of said last mentioned positions for causing accumulating operations, means operated by another of said elements to move said link to a second of said plurality of positions for causing non-adding operations, means to retain said link in said last mentioned position against the tension of said resilient means, and record controlled means to release said retaining means whereby said resilient means may become effective.

12. In a machine of the class described, the combination of accumulator engaging and disengaging mechanism comprising elements operating identically in accumulating and total taking operations, an accumulator frame, operating connections between said elements and said frame, said connections comprising a link selectively movable to a plurality of positions and operable by one of said elements while in certain of said positions for causing accumulating or total taking engagement of said accumulator, resilient means tending to move said link to one of said last mentioned positions for causing accumulating operations, means operated by another of said elements to move said link to a second of said plurality of positions for causing non-adding operations, means to retain said link in said last mentioned position against the tension of said resilient means, record controlled means to release said retaining means whereby said resilient means may become effective, and additional record controlled means to move said link to a third of said plurality of positions for causing total taking operations.

13. In a machine of the class described, the combination of an accumulator and two sets of actuators therefor, resilient means for causing the engagement of said accumulator and either of said sets of actuators, means to condition said engaging means to cause selective engagement of said accumulator and either of said sets of actuators including means normally arranged to condition said engaging means to cause the engagement of said accumulator and one of said sets of actuators and record controlled means to condition said engaging means to cause engagement of said accumulator and the other of said sets of actuators, of second resilient means for disengaging said accumulator and either of said sets of actuators when said engaging means is ineffective, a member arranged when operated to render said engaging means ineffective, cam controlled means for operating said member during a portion of a cycle of operation, and record controlled means to retain said member in operated position during the remainder of said cycle.

14. In a record controlled tabulating machine having an accumulator adapted to accumulate positive and negative amounts, members for entering positive and negative amounts in said accumulator and for taking the total therefrom, means for controlling the engagement of said accumulator and said members and normally arranged for causing accumulating engagement, and record controlled means to condition said last recited means for causing total taking engagement, the combination of means normally arranged to control the engaging means to cause a positive total to be taken when said engaging means is conditioned for total taking engagement, record controlled means to render said last recited means ineffective and to control said engaging means to cause a negative total to be taken, and means controlled by said accumulator for rendering said last recited means ineffective when the amount standing on said accumulator is positive.

15. In a record controlled tabulating machine having an accumulator adapted to accumulate positive and negative amounts, members for entering positive and negative amounts in said accumulator and for taking the total therefrom, means for controlling the engagement of said accumulator and said members and normally arranged for causing accumulating engagement, and record controlled means to condition said last recited means for causing total taking engagement, the combination of means normally arranged to control the engaging means to cause a positive total to be taken when said engaging means is conditioned for total taking engagement, record controlled means to render said last recited means ineffective and to control said engaging means to cause a negative total to be taken, means settable under control of said accumulator in accordance with the sign of the amount thereon, and means controlled by said settable means to render said last recited record controlled means ineffective when the sign of the amount on said accumulator is positive.

WILLIAM W. LASKER.
CHAS. RUIZ.